(12) United States Patent
Verschuur et al.

(10) Patent No.: US 6,202,929 B1
(45) Date of Patent: Mar. 20, 2001

(54) CAPACITIVE METHOD AND APPARATUS FOR ACCESSING INFORMATION ENCODED BY A DIFFERENTIALLY CONDUCTIVE PATTERN

(75) Inventors: Gerrit L. Verschuur, Lakeland, TN (US); Franz Hrubes, Rotthalmuenster (DE)

(73) Assignees: Micro-Epsilon Mess Technik (DE); Translucent Technologies, LLC, Memphis, TN (US)

( * ) Notice: Subject to any disclaimer, the term of this patent is extended or adjusted under 35 U.S.C. 154(b) by 0 days.

(21) Appl. No.: 09/265,658

(22) Filed: Mar. 10, 1999

(51) Int. Cl.[7] ....................................................... G06K 7/10
(52) U.S. Cl. .................. 235/462.25; 235/449; 235/494; 235/468
(58) Field of Search ..................................... 235/449, 494, 235/375, 439, 468, 462.25, 470, 493

(56) References Cited

U.S. PATENT DOCUMENTS

| | | |
|---|---|---|
| 3,519,802 | 7/1970 | Cinque et al. . |
| 3,593,319 | 7/1971 | Barber et al. . |
| 3,699,311 | 10/1972 | Dunbar . |
| 3,730,086 | 5/1973 | Dauterman . |
| 3,903,543 | 9/1975 | Smith . |
| 3,932,731 * | 1/1976 | Moore, Jr. .......................... 235/449 X |
| 4,528,655 | 7/1985 | Tamura et al. . |
| 4,591,189 | 5/1986 | Holmen et al. . |
| 4,614,362 * | 9/1986 | Breen et al. ......................... 283/58 X |
| 4,658,207 | 4/1987 | Scribano et al. . |
| 4,706,014 | 11/1987 | Fabbri . |
| 4,880,964 | 11/1989 | Donahue . |
| 4,951,800 | 8/1990 | Yoshihara . |
| 5,036,984 | 8/1991 | Labarthe . |
| 5,068,617 | 11/1991 | Reich . |
| 5,140,272 | 8/1992 | Nishimatsu et al. . |
| 5,198,777 | 3/1993 | Masuda et al. . |
| 5,231,359 | 7/1993 | Masuda et al. . |
| 5,241,163 * | 8/1993 | Yachtsovanos et al. ............. 235/449 |
| 5,241,280 | 8/1993 | Aidun et al. . |
| 5,281,921 | 1/1994 | Novak et al. . |
| 5,288,994 | 2/1994 | Berson . |
| 5,293,031 * | 3/1994 | Goto et al. ......................... 235/449 |
| 5,378,994 | 1/1995 | Novak et al. . |
| 5,394,969 | 3/1995 | Harbaugh . |
| 5,418,467 | 5/1995 | Floch et al. . |
| 5,430,278 * | 7/1995 | Kreig et al. ......................... 235/449 |
| 5,471,039 | 11/1995 | Irwin, Jr. et al. . |
| 5,475,205 | 12/1995 | Behm et al. . |
| 5,522,921 | 6/1996 | Custer . |
| 5,528,153 | 6/1996 | Taylor et al. . |
| 5,530,368 | 6/1996 | Hildebrand . |
| 5,531,434 | 7/1996 | Kerschner . |
| 5,599,046 | 2/1997 | Behm et al. . |
| 5,616,911 * | 4/1997 | Jagielinski ......................... 235/493 |
| 5,621,200 | 4/1997 | Irwin, Jr. et al. . |
| 5,650,730 | 7/1997 | Herbst, Jr. . |
| 5,811,792 | 9/1998 | Verschuur et al. . |

* cited by examiner

Primary Examiner—Michael G Lee
(74) Attorney, Agent, or Firm—Eugene Stephens & Associates; Thomas B. Ryan

(57) ABSTRACT

Barcode patterns or other meaningful patterns are printed with a differentially conductive ink. A sensor incorporating a plurality of capacitive couplings distinguishes features of the patterns by comparative measurements that are largely independent of variations between the sensor and the patterns affecting all of the couplings. The patterns can be distinguished despite being hidden from view, such as inside sealed envelopes.

69 Claims, 12 Drawing Sheets

CAPACITIVE METHOD AND APPARATUS FOR ACCESSING INFORMATION ENCODED BY A DIFFERENTIALLY CONDUCTIVE PATTERN

TECHNICAL FIELD

The invention relates to the acquisition of encoded information, particularly barcode, that is written in a differentially conductive pattern and can be concealed from view within an envelope or other layered structure.

BACKGROUND

Much of bulk return mail is processed with at least some manual handling, especially when it contains orders. Once cut open, the envelopes are generally emptied by hand; and information from their contents is keyboarded, optically scanned, or otherwise entered into a computer. The required steps of opening the envelopes, separating their contents, and entering relevant data are expensive and time consuming. Also, data entry is subject to error, especially when information printed on the envelopes must be linked to information from their contents.

Outgoing bulk mail is also subject to sorting and other processing errors that are difficult to detect; because once sealed, their contents are concealed from view. For example, inserts containing confidential information can be placed in the wrong envelopes addressed to persons who become privy to private information of others. Many different approaches have been used to see through the envelopes and read their contents without opening them but problems plague each.

U.S. Pat. No. 5,522,921 to Custer proposes use of x-rays for reading envelope contents that are printed with special x-ray opaque materials. The x-rays penetrate the envelopes and their contents except where blocked by the special materials. A resulting shadow pattern is detected by an x-ray reading device. However, the special materials add expense and limit printing options, and the x-rays pose health risks that are difficult to justify for these purposes.

U.S. Pat. No. 5,288,994 to Berson proposes using infrared light in a similar manner to read the contents of sealed envelopes. A light source directs a beam of the infrared light through the envelopes to an optical detector that records a shadow pattern caused by different absorption characteristics between conventional inks and the paper on which they are printed. However, such filled envelopes make poor optical elements for transmitting images, even for transmissions in the infrared spectrum. Paper does not transmit the infrared images very efficiently. Irregularities in the surfaces, spacing, layering, and materials of the envelopes and their contents cause significant aberrations that can greatly diminish resolution of the images. Also, overlays of printed material on the envelopes and their contents are difficult to separate, and printed backgrounds can reduce contrast.

Except for differences in wavelength, these prior approaches are analogous to shining a flashlight through one side of an envelope in the hope of reading darker printed matter through the envelope's opposite side. X-rays penetrate paper very easily but are dangerous and require special materials to stop them. Near infrared wavelengths transmit poorly through paper, and their images are subject to aberration from optical inconsistencies and to obscuration from printed overlays or backgrounds.

U.S. Pat. No. 5,811,792 by two of the present co-inventors, Verschuur and Mitchell, Jr., proposes a combination of microwave heating and infrared viewing to access the contents of sealed envelopes. Microwave energy differentially heats conductive or dielectric patterns in the contents, and infrared detectors record thermal images of the patterns conducted to the envelopes' surfaces.

U.S. Pat. No. 5,621,200 to Irwin, Jr. et al. discloses an electronic validation system for scratch-off lottery tickets. A conductive ink containing a pattern of resistors is printed as a portion of the scratch-off material or underlying play indicia. Capacitors couple the printed resistor circuits to an electronic verification machine to verify electronic signature patterns of the resistor circuits. The electronic signatures are comparable to predetermined standards, but they do not contain information encoded in conventional formats that can be read as alphanumeric characters. Also, each ticket must be tested one at a time at a predetermined position within the verification machine.

U.S. Pat. No. 3,519,802 to Cinque et al. discloses an early attempt at authenticating credit cards with internally encoded data. Conductive plates are arranged in a pattern; and their presence, absence, or proximate orientation is detected by a capacitance sensor. However, the detection system requires the conductive plates to be bent into two offset planes that complicate manufacture and are not readily applicable to thinner substrates such as sheet materials normally enclosed by envelopes.

U.S. Pat. No. 4,591,189 to Holmen et al. discloses a more recent example of a credit card verification system in which a light-transmitting authenticating layer is sandwiched between two anti-reflective film layers. The authenticating layer is preferably vacuum deposited, such as by sputtering, but can also be formed by a printed layer of conductive ink. The impedance, conductance, or capacitance of the authenticating layer can be detected, though capacitance is not recommended for detecting discrete areas of the authenticating layer. Beyond authentication, the conductive layer does not contain any useful information.

U.S. patent application Ser. No. 09/059,985 by Verschuur, Mitchell, Jr., and Leordeanu describes a capacitive method and apparatus for reading barcode printed on inserts and hidden inside sealed envelopes. Changes in a measurement of capacitive coupling between two electrodes in the presence of the barcode is interpreted to distinguish different barcode patterns. This application is hereby incorporated by reference.

A number of factors can affect such capacitive coupling measurements including wobble of the envelopes past the electrodes, vibration of the envelope transport, different numbers or thicknesses of dielectric layers separating the barcode from the electrodes, variations in the position or angular orientation of the barcode, and overcoupling effects between adjacent bars of the barcode.

SUMMARY OF INVENTION

Our invention includes among its embodiments a new reader that makes capacitive coupling measurements to acquire information encoded by differentially conductive patterns. Inserts within envelopes and other hidden substrates can be printed with a conductive or dielectric ink in the form of barcode or other symbols and advanced through our reader to convey information otherwise hidden to conventional optical readers. The coupling measurements can be made simultaneously and compared with each other independently of structural, environmental, or other factors that affect the measurements collectively to distinguish features within the patterns from one another.

For example, our reader for acquiring information encoded by a differentially conductive pattern can include a plurality of electrodes positioned within one or more electrical fields generated by at least one of the electrodes. A signal processor obtains capacitive coupling measurements of the differentially conductive pattern between at least three different pairings of the electrodes as the pattern is relatively moved through the one or more electrical fields. A logic processor compares the simultaneous measurements with each other independently of variations having similar effects on the compared measurements to distinguish features of the differentially conductive pattern.

Preferably, the logic processor compares simultaneous measurements from a first grouping of the paired electrodes and uses the outcome of this comparison to trigger another comparison between simultaneous measurements from a second grouping of the paired electrodes to distinguish the features of the pattern. The former comparison can also be used to locate reference points in the pattern as the pattern is advanced past the electrodes.

One embodiment, which is particularly useful for reading barcode, arranges the electrodes in an array and positions the electrodes along a common axis that is coincident with a direction of the relative motion between the barcode and the electrodes. A first and a third electrode straddle a second electrode along the common axis. The processor compares simultaneous coupling measurements between a fourth electrode and each of the first and third electrodes to locate the reference points in the barcode and to trigger a further comparison between the coupling measurements. The further comparison, which distinguishes a bar dimension of the barcode, simultaneously compares a coupling measurement between the second and fourth electrodes to a combination of coupling measurements between the fourth electrode and each of the first and third electrodes.

The barcode dimension of interest can be bar width, which is measured along the common axis of the electrode array. When either a wide or a narrow bar is centered along the array, the capacitive couplings that involve pairings with the first and third electrodes are substantially equal. A narrow bar overlaps just the second electrode, but a wide bar overlaps portions of both the first and third electrodes as well. The electrodes are sized relative to the bar widths so that the sum of coupling measurements involving the first and third electrodes is larger than a simultaneous coupling measurement involving the second electrode when a wide bar is centered in the electrode array and smaller when a narrow bar is similarly centered.

The fourth electrode, which is preferably aligned end to end with the second electrode, can function as a transmitter; and the first, second, and third electrodes can function as separate receivers. The signal processor gathers the signals from the separate receivers and converts the signals into a more useful form for making comparisons. Alternatively, each of the first, second, and third electrodes can function as transmitters, and the fourth electrode can function as a receiver. The individual pairings of the three transmitters with the single receiver can be distinguished by transmitting a different frequency from each of the three transmitters. A demultiplexer within the signal processor isolates the different frequency signals from the different electrode pairings. More transmitters or more receivers can be paired together and distinguished by different receivers or different frequencies to gather more information about the comparative features of barcode or other information patterns.

The invention is particularly useful for processing a succession of envelopes having information encoded in their contents. The information is recorded in patterns of contrasting permittivity. Preferably, the patterns are printed with an electrically conductive ink on a dielectric medium that is inserted within the envelopes. The envelopes are transported together with their encoded contents past our new reader. Simultaneously measured variations in a plurality of capacitive couplings are compared with each other to isolate and distinguish features within the patterns. The information obtained by the relative measurements can be meaningfully interpreted and used to affect further processing of the envelopes.

For example, the information obtained from the envelopes' contents can identify intended addressees of the envelopes. The actual addressees can be read by standard optical means from the exterior of the envelopes and compared to the address information obtained from their contents to verify if they match. The further processing of the envelopes is discontinued upon detection of a mismatch. Alternatively, the address information obtained from the envelopes' contents can be used to print corresponding address information on the exterior of new envelopes. Orders for further processing can also be read from the envelopes' contents.

A system for carrying out the invention can include a transporter that conveys a succession of covered substrates imprinted with differentially conductive patterns in a first direction. An array of electrodes is positioned along the first direction and together with at least one more electrode provides at least three different capacitive couplings that are affected by the differential conductivity characteristics of the patterns. A processor performs a first comparison among a first grouping of the capacitive couplings and initiates a second comparison among a second grouping of the couplings coinciding with a predetermined outcome of the first comparison.

The two comparisons contribute to identifying features within the patterns and to distinguish them by their differing effect on the compared capacitive couplings. The processor can also match the distinguished features of the patterns to stored information about similar patterns for reading the encoded information. For example, numerical representations of the acquired patterns can be compared with a table of data describing the expected pattern or other known patterns. A sorter can be used to distinguish subsequent processing of the covered substrates based on the encoded information that would otherwise be hidden from view.

Together, the electrodes form a sensor head, which can be fixed in place relative to an advancing differentially conductive pattern or advanced with respect to a stationary differentially conductive pattern. For large-scale processing, a transporter is preferably used to move the differentially conductive patterns past the sensor head. Where such in-line processing is not appropriate, a hand-held sensor can be passed over the differentially conductive pattern to produce the desired signals. The hand-held version would also be practical for reading barcode stamped onto metal surfaces.

While our reader is especially useful for processing hidden information patterns, particularly patterns contained within envelopes, our reader can function similarly whether the information is hidden or not.

DRAWINGS

DETAILED DESCRIPTION

Figure 1A:
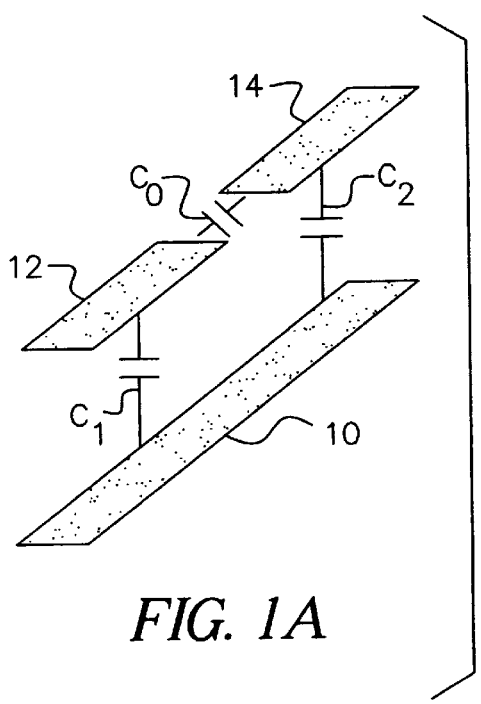
FIG. 1A is a schematic perspective view of a pair of transmitting and receiving electrodes overlying a passing conductive bar pattern.
Figure 1B:
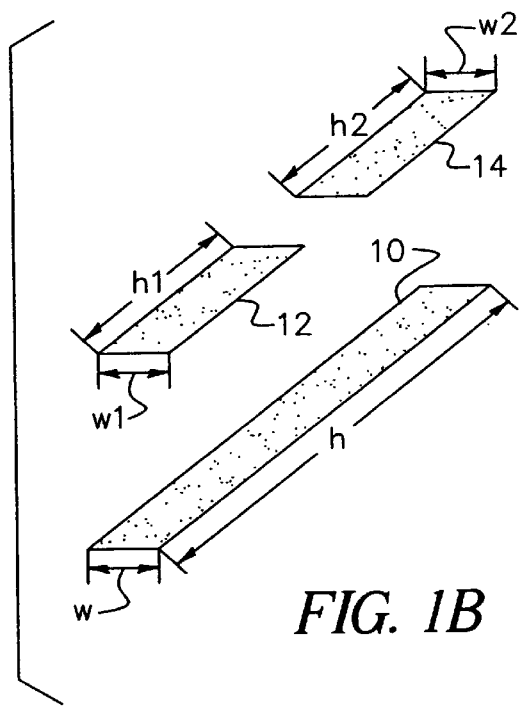
FIG. 1B is a similar view showing dimensions of the two electrodes and the conductive bar pattern.
Figure 2:
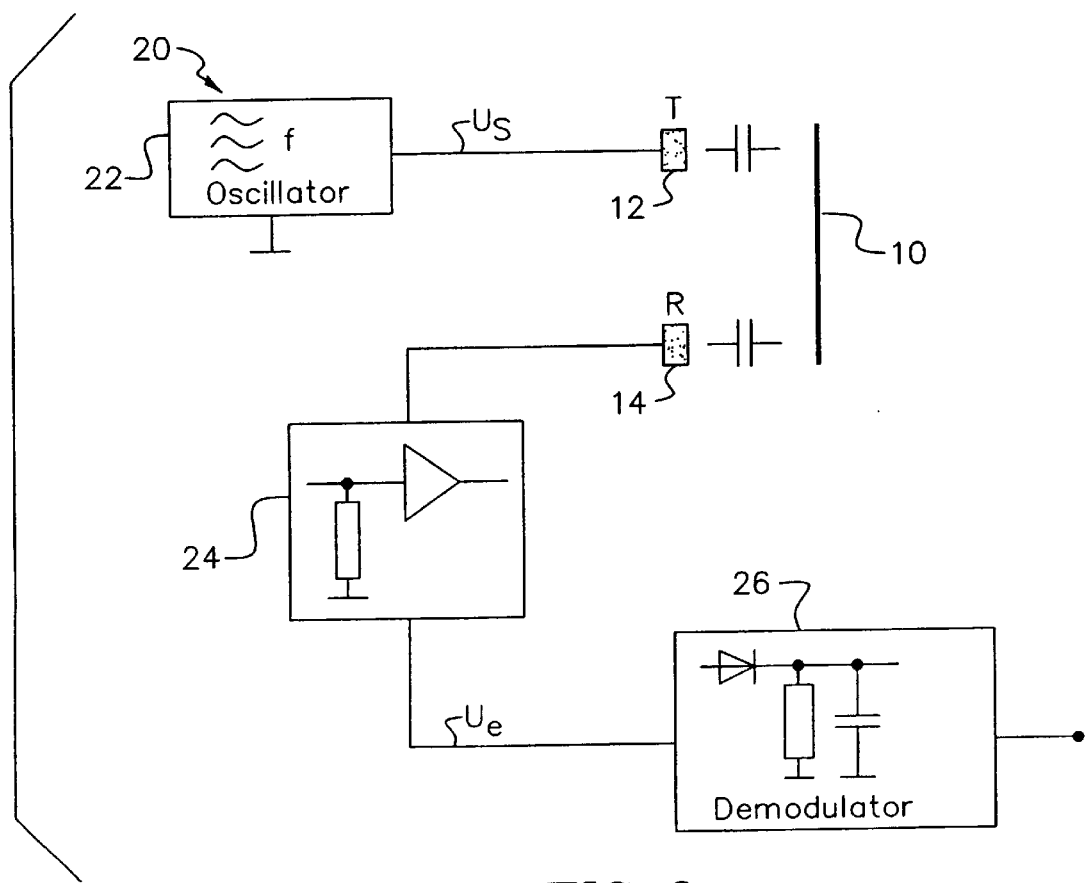
FIG. 2 is a diagram showing the additional components of a capacitive barcode reader incorporating the two electrodes.

In FIGS. 1A and 1B, an electrically conductive bar 10 is positioned in alignment with a transmitting electrode 12 and a receiving electrode 14 of a barcode reader 20, which is shown more fully in FIG. 2. An oscillator 22 of the barcode reader 20 supplies the transmitting electrode 12 with a voltage "$U_S$" at a frequency "f", preferably in a range of 20–50 kilohertz. Capacitive couplings "$C_1$" and "$C_2$" between the transmitting electrode 12 and the conductive bar 10 and between the conductive bar 10 and the receiving electrode 14 induce a voltage "$U_e$" in the receiving electrode 14. The voltage signal $U_e$ is amplified by an input buffer stage 24 and further processed by a demodulator (e.g., rectifier) 26 to obtain a useful DC voltage that is proportional to the voltage received by the electrode 14.

The capacitive couplings $C_1$ and $C_2$ depend on three main factors: (a) areas of overlap between each of the two electrodes 12 and 14 and the conductive bar 10, (b) distances between each of the two electrodes 12 and 14 and the conductive bar 10, and (c) permittivities of the dielectric mediums interposed between each of the two electrodes 12 and 14 and the conductive bar 10. Decreasing these distances and increasing the areas of overlap and the permittivities enhance the capacitive couplings $C_1$ and $C_2$.

The area dimensions of the two electrodes 12 and 14 and the conductive bar 10 are depicted in FIG. 1B. A product of a height dimension "h" and a width dimension "w" gives the area of the conductor 10. The electrodes 12 and 14 have areas corresponding to the products of height dimensions "h1" and "h2" and width dimensions "w1" and "w2". The total overlap between the two electrodes 12 and 14 and the conductive bar 10 is generally smaller than the area (h×w) of the conductive bar 10 because the sum of the electrode height dimensions (h1+h2) is less than the height dimension "h" of the conductive bar 10. Parts of the conductive bar 10 protruding beyond the ends of the electrodes 12 and 14 contribute only marginally to the capacitive couplings $C_1$ and $C_2$.

Figure 3:
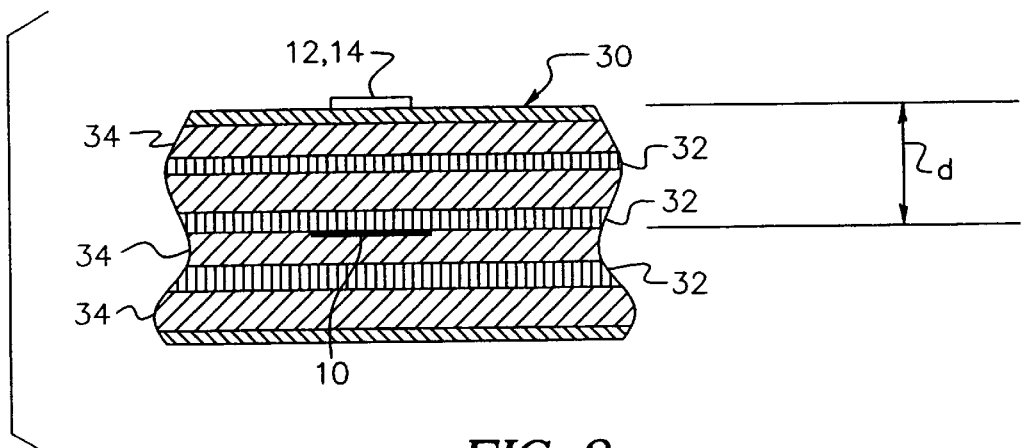
FIG. 3 is a cross-sectional view of an envelope showing the relative location of the conductive bar pattern printed on one of a number of inserts inside the envelope.

A common distance "d" between the two electrodes 12 and 14 and the conductive bar 10 is shown as an exemplary dimension in FIG. 3. An envelope 30 shown in cross section contains three paper inserts 32 separated by layers of air 34. The conductive bar 10 is printed on one of the inserts 32. The electrodes 12 and 14 seen end-on in this figure are positioned on top of the envelope 30 at the distance d from the conductive bar 10. The alternating layers of paper inserts 32 and air 34 form a dielectric medium separating the two electrodes 12 and 14 from the conductive bar 10.

If there is no electrical conductor in the vicinity of the electrodes 12 and 14, then ideally there is no voltage $U_e$ at the receiving electrode 14. In practice, however, there is a small coupling capacity "$C_0$" between the electrodes 12 and 14, which produces a small residual receiving voltage $U_e$ in the absence of an electrical conductor. Appropriate shielding can be used to isolate the two electrodes 12 and 14.

Figure 4:
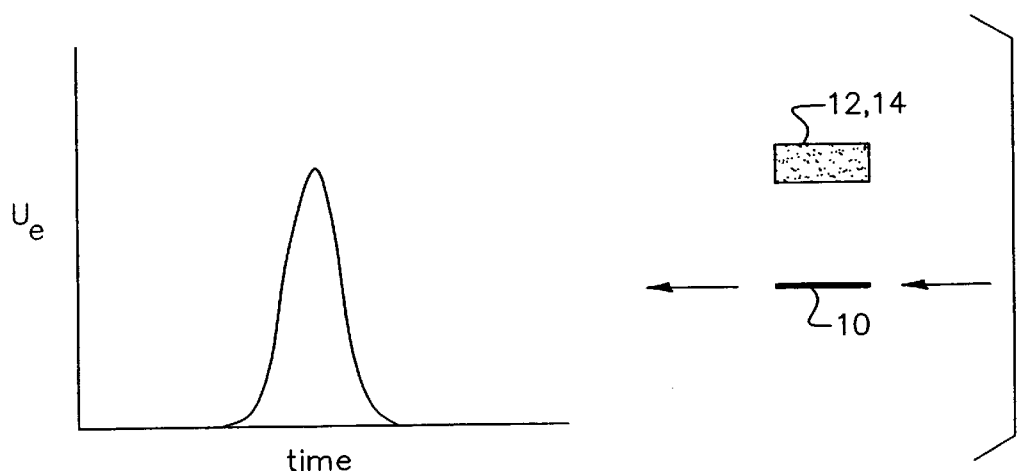
FIG. 4 is a graph showing a signal expected from a single conductive bar passing by the two electrodes.

FIG. 4 plots the manner in which the demodulated receiving signal $U_e$ varies with time as the conductive bar 10 passes beneath the electrodes 12 and 14. The signal $U_e$ increases to a maximum and then returns to zero, the whole plot tracing the shape of a bell curve.

At the distance d between the conductive bar 10 and the two electrodes 12 and 14 and at a fixed amplitude of the transmitting signal $U_S$, the receiving voltage signal $U_e$ shows two key things: (a) the center location of the conductive bar 10 with respect to the electrodes 12 and 14 corresponding to the peak amplitude of the signal $U_e$ and (b) the width w of the conductive bar 10 corresponding to a duration of the signal (e.g., measured at full width half maximum). Accordingly, a distinction can be made between wide and narrow conductive bars, which renders this technology suitable for reading of barcode patterns in which wide and narrow bars of uniform height are used to encode information.

Figure 5:
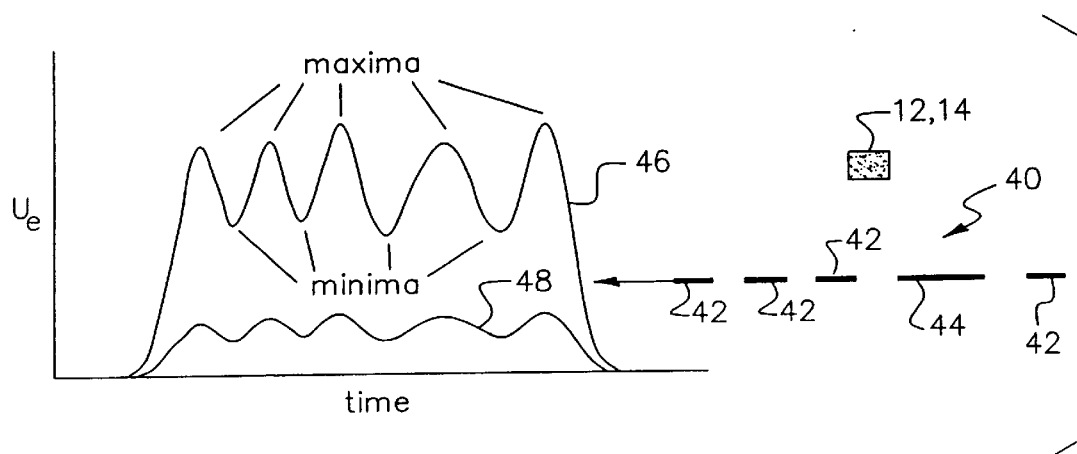
FIG. 5 is a graph contrasting signals generated by bars of differing widths passing by the electrodes at two different distances from the electrodes.

A plot in FIG. 5 shows a succession of partially overlapping bell-curve-shaped responses of the signal $U_e$ which occur when a barcode pattern 40 of both narrow bars 42 and wide bars 44 moves past the electrodes 12 and 14. The closer the conductive bars 42 or 44 lie to one another, the higher the receiving voltage $U_e$ and the less distinction between maxima and minima of the individual response curves associated with each of the bars 42 or 44. When the conductive bars 42 or 44 are too close together, distinctions between the response curves are lost, a condition that limits the resolution of the reader 20. The resolving power of the reader 20 also diminishes with increases in the distance d. Traces 46 and 48 of FIG. 5 contrast resolutions at two different distances d.

In principle, it is possible to distinguish between wide and narrow conductive bars 42 and 44 and to determine their spacing with respect to one another by observing the pattern of maxima and minima in the receiving signal $U_e$. However, this assumption breaks down if the distance d between the electrodes 12 and 14 and the passing conductive bars 42 and 44 varies with time. This happens as a result of wobble—the up and down movement of the envelope 30 toward and away from the electrodes 12 and 14, or other forms of unwanted motion such as vibration in a transport device. These act to increase or reduce the receiving signal $U_e$, depending on the distance between the envelope 30 and the electrodes 12 and 14. The signal $U_e$ also changes amplitude if the conductive bars 42 or 44 move out of parallel with the aligned electrodes 12 and 14. In addition, cross-coupling between adjacent conductive bars 42 or 44 further obscures signal distinctions between them. All these variations can cause changes in the amplitude of the receiving signal $U_e$, which can detract from its meaningful interpretation.

Figure 6:
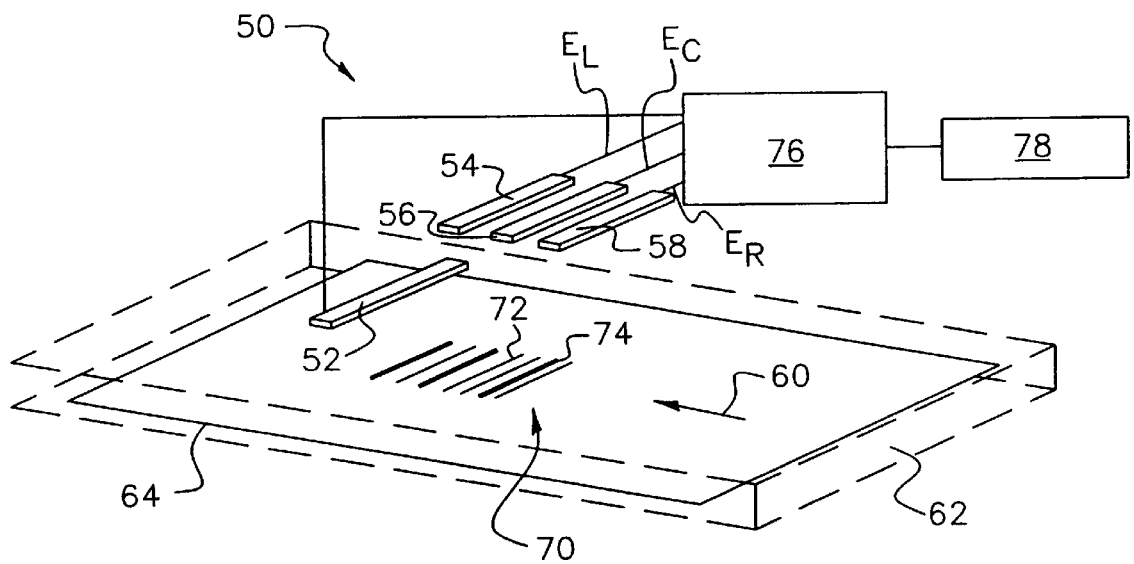
FIG. 6 is a schematic perspective view showing the relative locations of three receiving electrodes and one transmitting electrode with respect to a passing envelope containing an insert on which a barcode pattern has been printed.

However, we have found ways to distinguish features of barcode patterns and other patterns despite instabilities between electrodes and barcode patterns. One such way illustrated by FIG. 6 features a new sensor 50 having a single transmitting electrode 52 and an array of three receiving electrodes 54, 56, and 58 positioned along a common axis 60 of relative linear motion between an envelope 62 and the sensor 50. The transmitting electrode 52 is aligned with the middle receiving electrode 56 in the same position along the common axis 60. An insert 64 contained within the envelope 62 is imprinted with a conductive ink in the barcode pattern 70, which has a series of narrow and wide conductive bars 72 and 74.

The insert 64 on which encoded information is printed is preferably paper, which is a dielectric. However, other non-conducting materials including resin films or fabric materials can also be used as substrates for supporting conductive substances or substances with different permittivities. The conductive ink used for printing the barcode pattern 70 can be visible for conveying optically readable information or can be invisible for performing other functions such as those relating to tracking, accounting, or security. The barcode 70 can also be hidden between layers of additional inserts for similar purposes. Examples of conductive inks appropriate for these purposes include the ink used in a Hewlett-Packard desk jet printer (model number 870CSE) and certain iron-based inks used in coldset printing.

Figure 7:
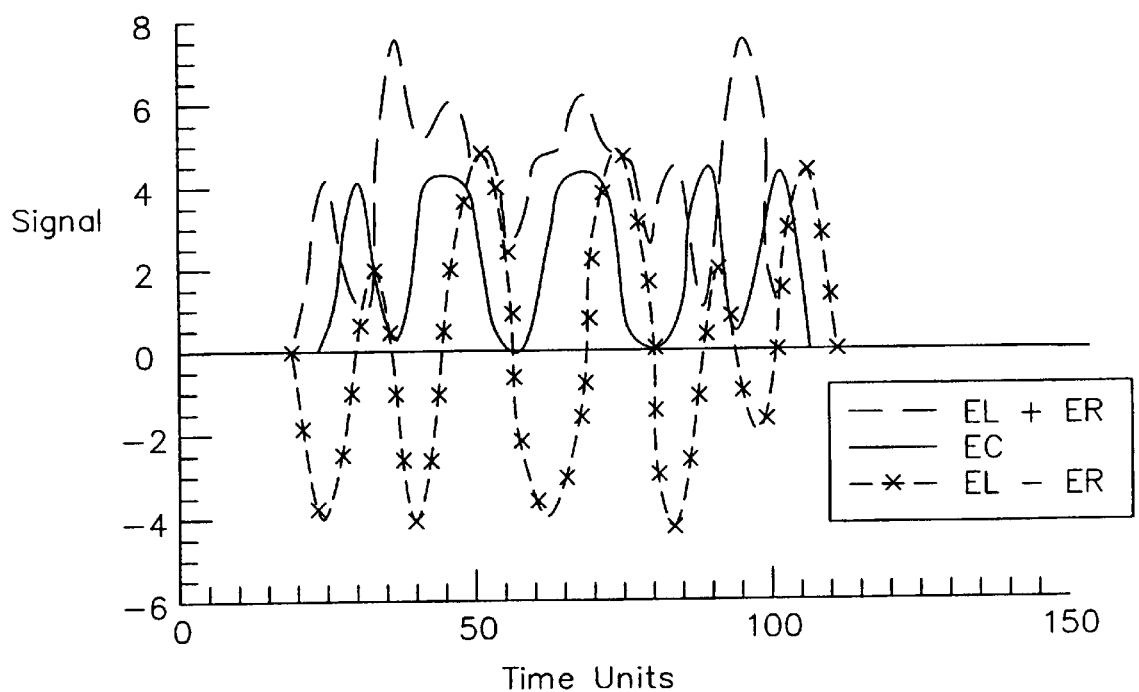
FIG. 7 is a graph plotting combinations of signals from the three receiving electrodes, which can be compared to derive information about the location and width of conductive bars in the barcode pattern.

Separate voltage signals "$E_L$", "$E_C$", and "$E_R$" can be detected at the three receiving electrodes 54, 56, and 58. A signal processor 76 in conjunction with a logic processor 78 (e.g., a microprocessor) combines these signals to produce three comparable outputs, namely, $(E_L-E_R)$, $E_C$, and $(E_L+E_R)$, which are separately plotted in FIG. 7 for an exemplary barcode pattern.

The difference output $(E_L-E_R)$ varies between positive values when one of the conductive bars 72 or 74 is closer to the electrode 54 and negative values when the same conductive bar 72 or 74 is closer to the electrode 58. The output $(E_L-E_R)$ is zero when the bar 72 or 72 is nearest the electrode 56 at equal distances from the electrodes 54 and 58. Determination of this zero point defines a reference location of the bar 72 or 74 within the electrode array and provides a point of commonality for making further comparisons between the remaining outputs $(E_L+E_R)$ and $E_C$.

For one of the narrow bars 72, whose width is comparable to that of the electrodes 54, 56, or 58, the output $(E_L+E_R)$ has a profile that is broader than the output $E_C$ but lower in amplitude, particularly at the reference location in alignment with the electrode 56. The effective area of overlap between the narrow bar 72 and the center electrode 56 is greater than the effective area of overlap between the narrow bar 72 and the two electrodes 54 and 58. Accordingly, a narrow bar 72 is detected by the condition $E_C>(E_L+E_R)$ when $E_L=E_R$.

For one of the wide bars 74, whose width straddles at least portions of the electrodes 54 and 58, the output $(E_L+E_R)$ has an amplitude that is greater than the amplitude of the output $E_C$ at the reference location of $(E_L=E_R)$. The effective area of overlap between the wide bar 74 and the two electrodes 54 and 58 is greater than the effective area of overlap between the wide bar 74 and the center electrode 56. Accordingly, a wide bar 74 is detected by the condition $E_C<(E_L+E_R)$ when $E_L=E_R$.

The two comparisons $E_L$ vs. $E_R$ and $E_C$ vs. $(E_L+E_R)$ concern only relative values of the voltage signals $E_L$, $E_C$, and $E_R$ and remain valid for distinguishing narrow and wide bars 72 and 74 despite variations having similar instantaneous effects on the voltage signals $E_L$, $E_C$, and $E_R$. Preferably, the distinguishing electrodes 54, 56, and 58 of the sensor 50 are mounted together in close proximity so that any such variation affecting one also affects the others equally. For example, if the distance between the envelope 62 and the sensor 50 varies, the amplitudes of the signals $E_L$, $E_C$, and $E_R$ increase or decrease. However, the two comparisons $E_L$ vs. $E_R$ and $E_C$ vs. $(E_L+E_R)$ are not affected by the distance variation because the signals $E_L$, $E_C$, and $E_R$ vary together and are compared only to each other.

Figure 8:
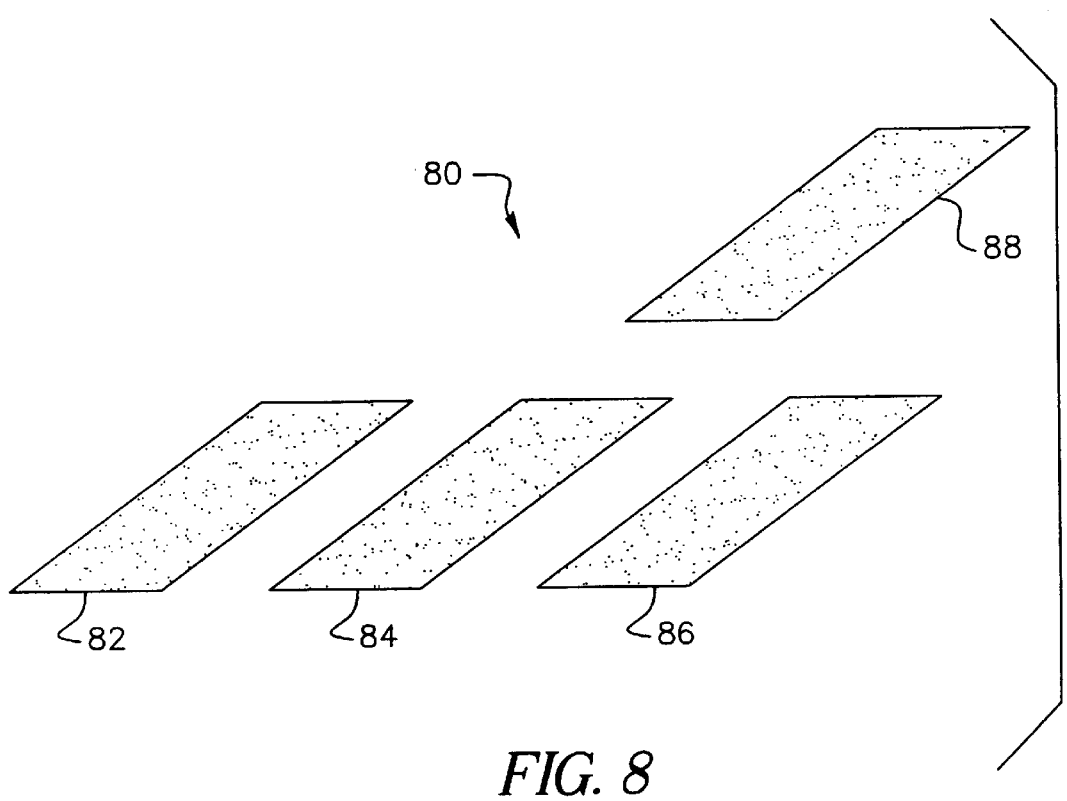
FIG. 8 is a schematic perspective view showing a similar arrangement of electrodes but whose functions of transmitting or receiving have been reversed.
Figure 9:
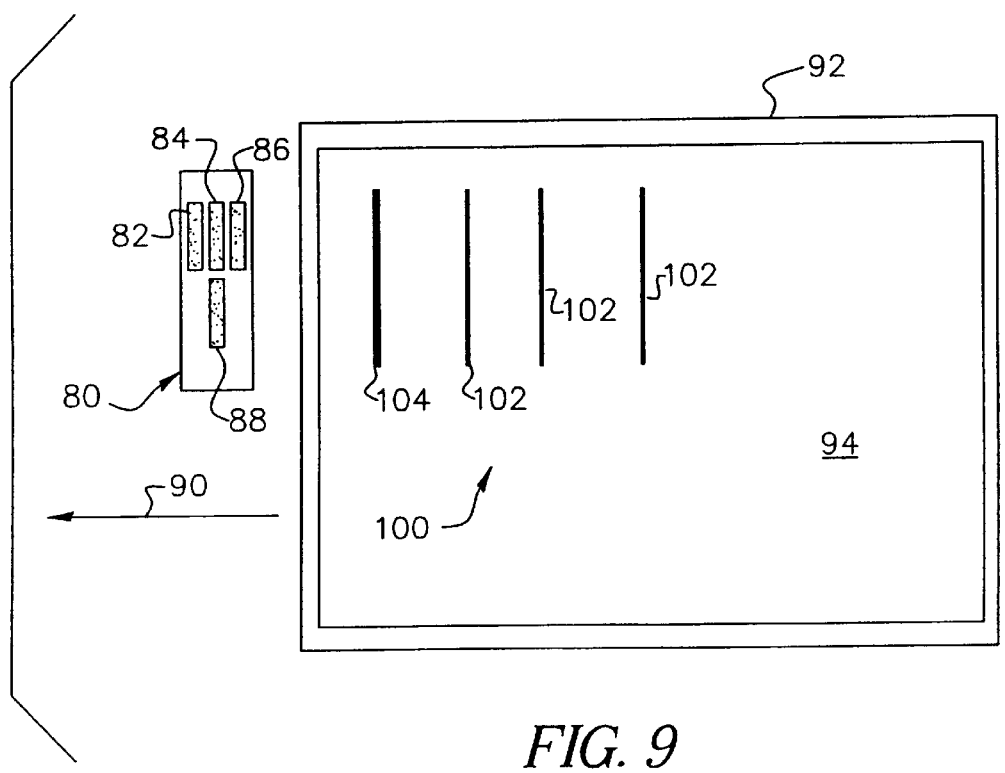
FIG. 9 is a schematic plan view of the same electrode pattern next to an advancing envelope containing a conductive barcode pattern.

An alternative sensor 80 first shown in FIGS. 8 and 9 has an array of three transmitting electrodes 82, 84, and 86 and a single receiving electrode 88. Similar to the receiving electrodes of the sensor 50, the transmitting electrodes 82, 84, and 86 of the alternative sensor 80 are oriented parallel to each other and positioned along a common axis 90 of relative motion between an envelope 92 and the sensor 80.

The single receiving electrode 88 is aligned with the middle transmitting electrode 84 in the same position along the common axis 90. An insert 94 contained within the envelope 92 is imprinted with a conductive ink in a barcode pattern 100, which has a series of narrow and wide conductive bars 102 and 104. The transmitting electrodes 82, 84, and 86 are separated by an amount that approximately corresponds to a minimum distance between narrow bars 102.

Figure 10:
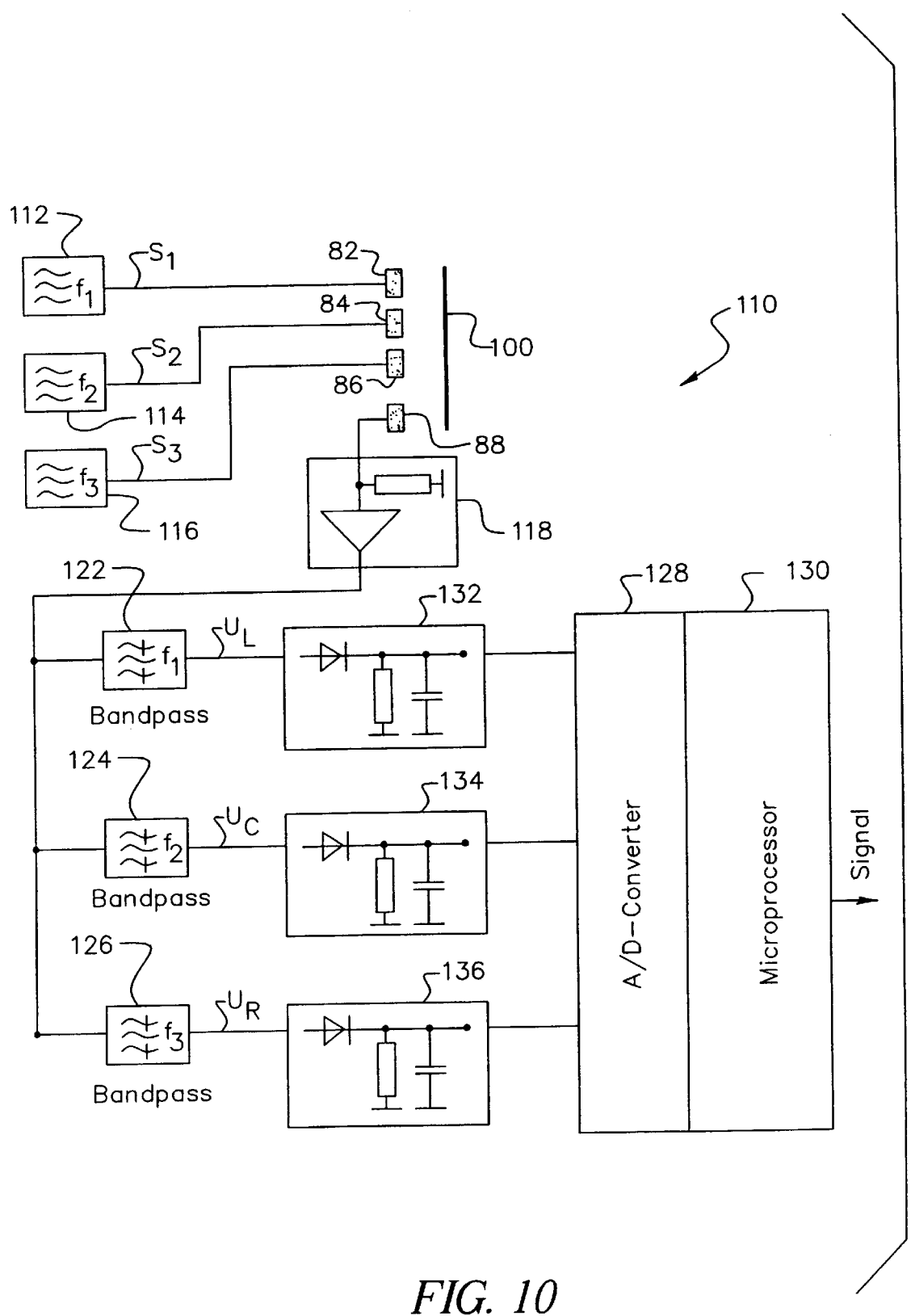
FIG. 10 is a diagram showing the additional components of a capacitive barcode reader incorporating the three transmitting electrodes and one receiving electrode.

The sensor 80 forms a portion of a barcode reader 110 that is shown in FIG. 10. Three oscillators 112, 114, and 116 drive the three transmitting electrodes 82, 84, and 86 at different frequencies "$f_1$", "$f_2$", and "$f_3$" with amplitudes of "$S_1$", "$S_2$", and "$S_3$". At the receiving electrode 88, all three of the frequencies $f_1$, $f_2$, and $f_3$ are mixed. However, following a buffer 118, three bandpass filters 122, 124, and 126 separate the receiving signal into three individual signals "$U_L$", "$U_C$", and "$U_R$" with center frequencies of $f_1$, $f_2$, and $f_3$. The three signals $U_L$, $U_C$, and $U_R$ are demodulated at detectors 132, 134, and 136 and then passed to an A/D converter 128 and microprocessor 130 for simultaneous processing similar to the signals $E_L$, $E_C$, and $E_R$.

Figure 11:
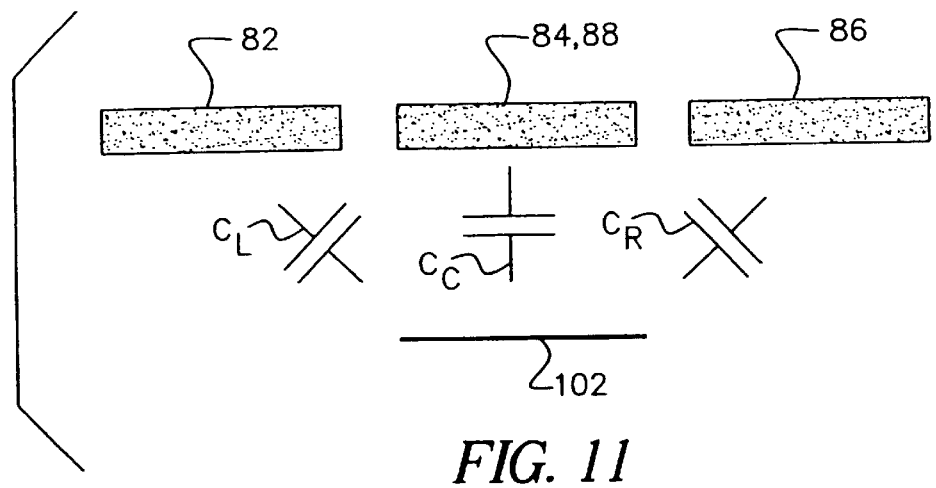
FIG. 11 is a schematic end view of a narrow conductive bar centered beneath the electrodes.
Figure 12:
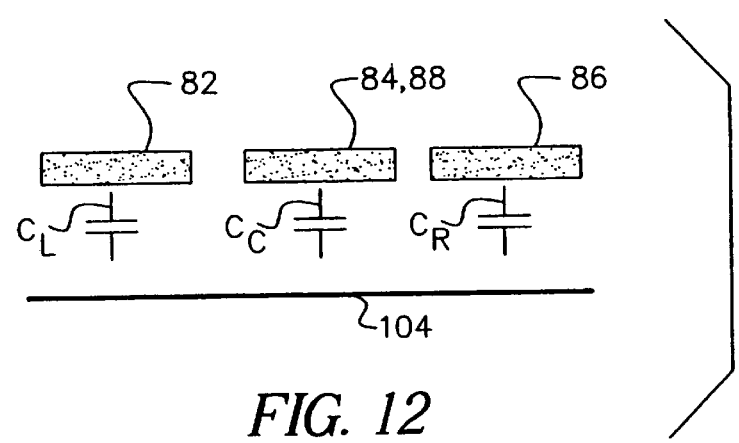
FIG. 12 is a schematic end view of a wide conductive bar centered beneath the electrodes.

FIGS. 11 and 12 illustrate primary couplings that occur between the transmitting electrodes 82, 84, and 86 and the narrow and wide bars 102 and 104. In FIG. 11, a narrow bar 102 is centered under the transmitting electrode 84 but is coupled to all three transmitting electrodes 82, 84, and 86 through capacitive couplings "$C_L$", "$C_C$", and "$C_R$". In terms of proximity, it is apparent that couplings $C_L$ and $C_R$ are equal and sum to a value that is less than the coupling "$C_C$". Accordingly, the coupled signals $U_L$, $U_C$, and $U_R$ distinguish the narrow bar 102 by the condition $U_C > (U_L + U_R)$ when $U_L = U_R$.

In FIG. 12, a wide bar 104 is centered under the transmitting electrode 84. The capacitive couplings $C_L$ and $C_R$ are equal and sum to a value greater than the capacitive coupling $C_C$ because of the additional overlap between the transmitting electrodes 82 and 86 and the wide bar 104. Accordingly, the coupled signals $U_L$, $U_C$, and $U_R$ distinguish the wide bar 104 by the condition $(U_L + U_R) > U_C$ when $U_L = U_R$.

Figure 13:
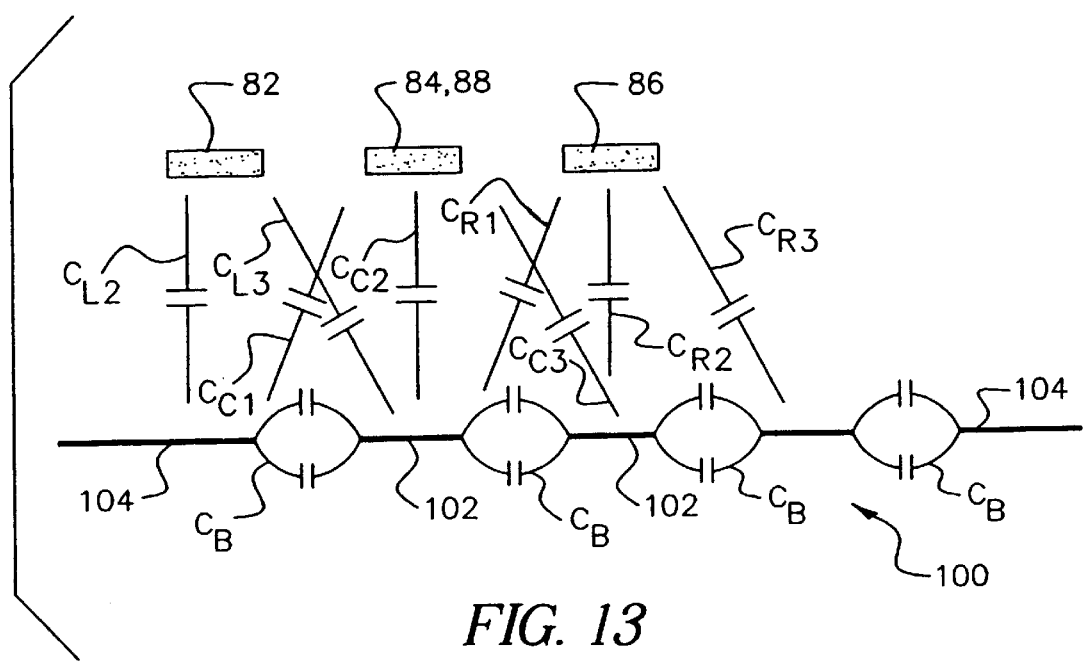
FIG. 13 is similar schematic end view showing capacitive coupling relationships arising from a pattern of wide and narrow bars.

FIG. 13 depicts a more complex set of couplings, which relate to the passing of the entire barcode pattern 100 beneath the sensor 80. Couplings are established between each transmitting electrode 82, 84, and 86 and more than one of the bars 102 or 104 as well as between the bars themselves. For example, the center electrode 84 is shown with couplings $C_{C1}$, $C_{C2}$, and $C_{C3}$ to one wide bar 104 and to two narrow bars 102. Couplings $C_B$ occur between the bars 102 or 104.

Figure 14:
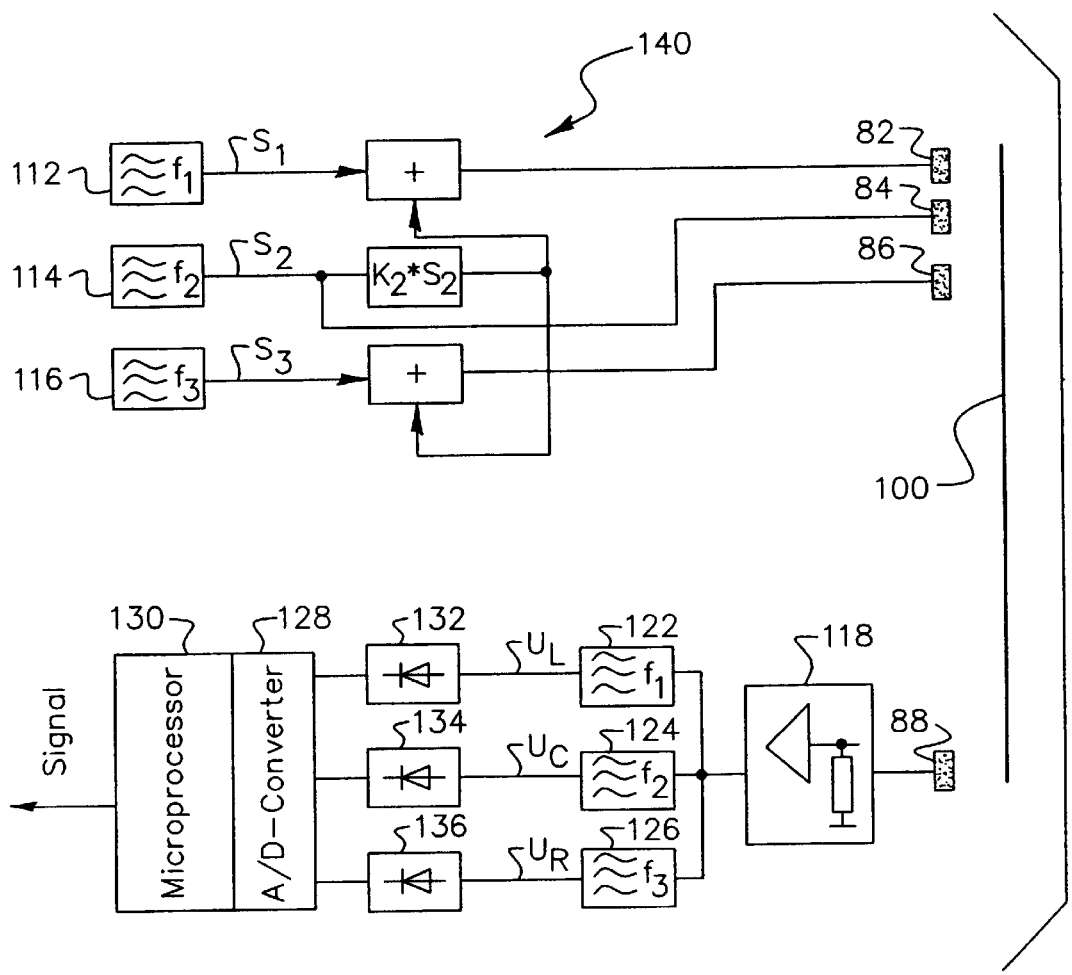
FIG. 14 is a diagram of another reader in which a frequency transmitted by one of the transmitting electrodes is also transmitted by the two other transmitting electrodes in an out-of-phase relationship.

A reader 140, similar to the reader 110 but modified to exploit the further coupling possibilities, is shown in FIG. 14. Most components are the same and are referenced with the same numerals. However, the frequency $f_2$ generated by the oscillator 114 is supplied not only to the transmitting electrode 84 but is also supplied with a positive gain factor "$K_2$" to the other transmitting electrodes 82 and 86 as well. For the receiving voltage $U_2$, this results in a larger amplitude difference between narrow bars 102 and wide bars 104 because considerably more voltage of frequency $f_2$ is coupled into a wide bar 104 than into a narrow bar 102. Effects of mutual overcoupling between the electrodes are also reduced.

Figure 15:
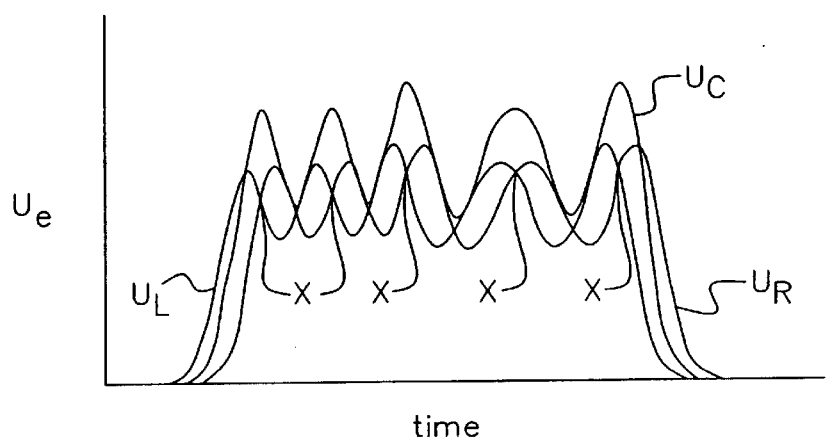
FIG. 15 is a graph plotting the different frequency signals in the presence of the same passing barcode pattern in which the transmitting electrodes are driven according to the circuit in FIG. 14.

FIG. 15 provides a plot of the three signals $U_L$, $U_C$, and $U_R$ for a barcode pattern similar to the barcode pattern of FIG. 5. Evaluation of the signals $U_L$, $U_C$, and $U_R$ is performed at the intersections of the two signals $U_L$ and $U_R$, which are each marked with an "X". At these points X, the two transmitting electrodes 82 and 86 have the same distance from a referenced bar 102 or 104, and the center electrode 84 has the shortest distance to the referenced bar 102 or 104. The identification of these points of intersection X triggers simultaneous evaluations of the other relationships between the three signals $U_L$, $U_C$, and $U_R$ that distinguish narrow and wide bars 102 and 104 (that is, the comparison of $U_L + U_R$ to $U_C$).

The reader 140 can also be modified to supply the frequency $f_2$ to the transmitting electrodes 82 and 86 at 180 degrees out of phase with the signal sent to transmitting electrode 84. This means that the receiving signal $U_2$ is not increased, but is decreased. In the case of the wide bar 104, the signal $U_2$ is decreased considerably more than a narrow bar 102. Also, the signal is not coupled into the neighboring bars 102 and 104 in phase but in phase opposition. Flattening of the receiving signal $U_2$ due to overcoupling from neighboring bars is therefore considerably reduced, i.e., the difference between amplitude maxima and minima becomes much more pronounced (e.g., see FIG. 5).

Figure 16:
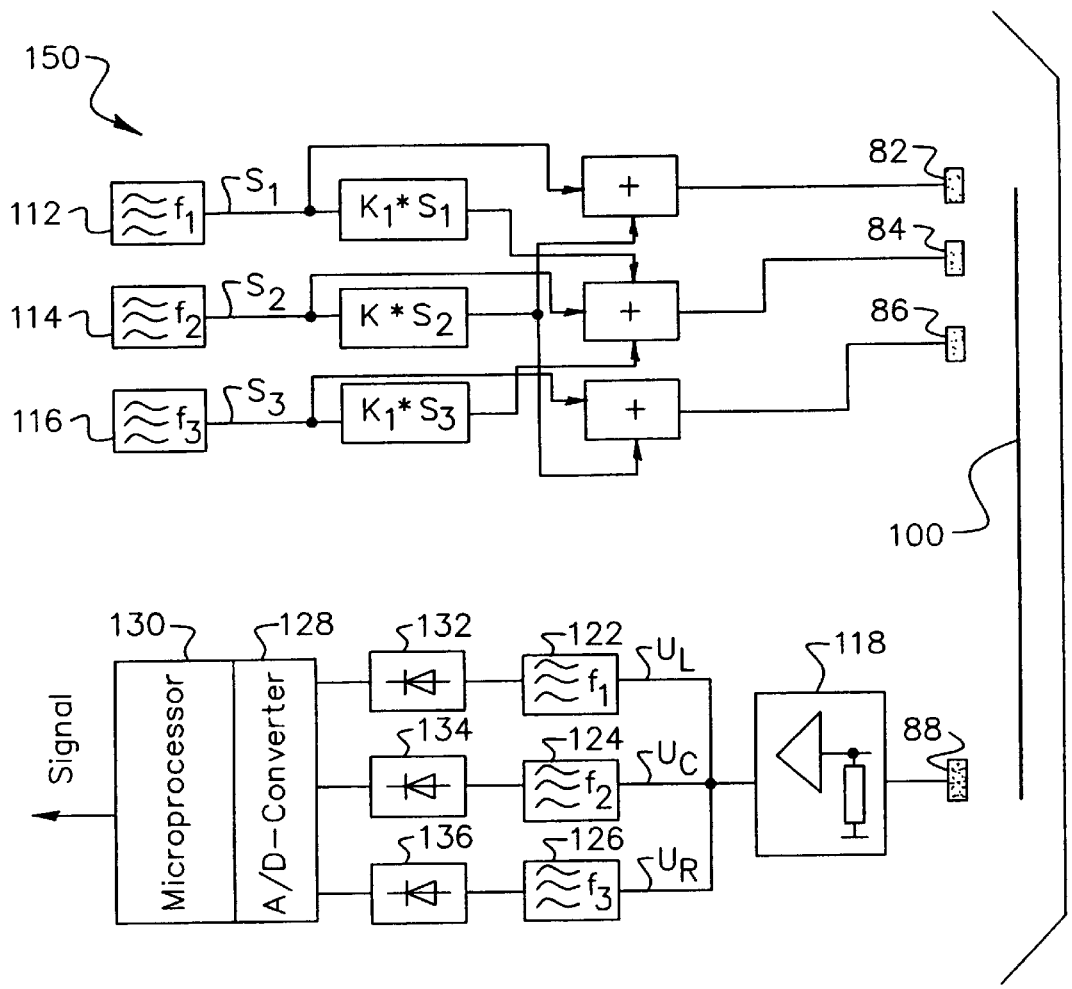
FIG. 16 is a diagram of another reader in which the transmitting electrodes are driven both at their own frequency and at the frequency of adjacent electrodes in an out-of-phase relationship.
Figure 17:
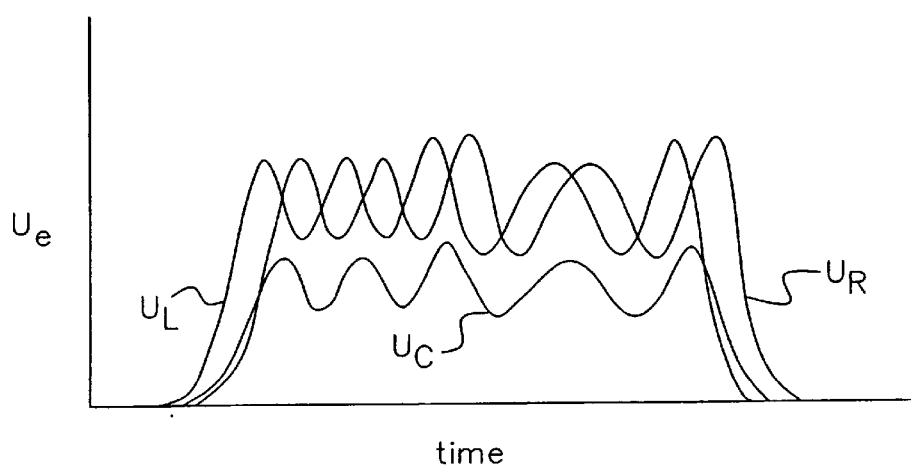
FIG. 17 is a graph plotting the different frequency signals in the presence of the same passing barcode pattern in which the transmitting electrodes are driven according to the circuit in FIG. 16.

FIG. 16 depicts another reader 150 modified to further distinguish the narrow and wide bars 102 and 104. In addition to transmitting the frequency $f_2$ from adjacent electrodes 82 and 86 at 180 degrees out of phase with transmissions from the electrode 84, the frequencies $f_1$ and $f_3$ are similarly transmitted from their adjacent electrodes. The frequency $f_1$ is amplified by a gain factor K1 and combined with the frequency $f_2$ at the transmitting electrode 84, and the frequency $f_3$ is also amplified by a gain factor K1 and combined with the frequency $f_2$ at the transmitting electrode 84. Both frequencies $f_1$ and $f_3$ are transmitted from the center electrode 84 at 180 degrees out of phase with respect to their primary transmissions from the electrodes 82 and 86. The more pronounced shapes of the three signals $U_L$, $U_R$, and $U_C$ are apparent from their plot in FIG. 17.

Figure 18:
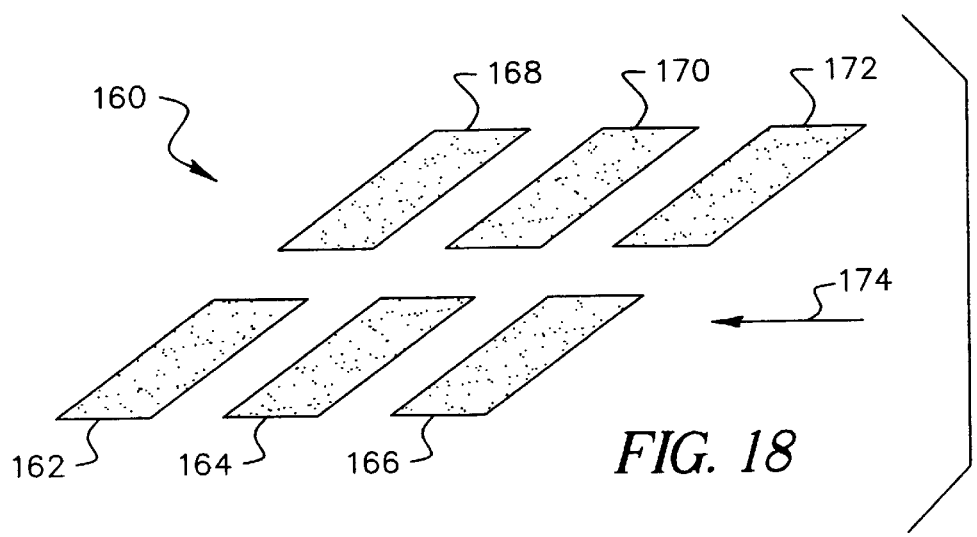
FIG. 18 is a schematic perspective view showing an array of three transmitting electrodes and three receiving electrodes.

Another exemplary sensor 160 for making even finer distinctions is shown in FIG. 18, configured by a square array of three transmitting electrodes 162, 164, and 166 and three receiving electrodes 168, 170, and 172. Each of the transmitting electrodes 162, 164, and 166 is paired with one of the three receiving electrodes 168, 170, and 172 in alignment with each other in positions displaced along a common axis 174 of relative motion between the sensor 160 and the barcode pattern 100.

Figure 19:
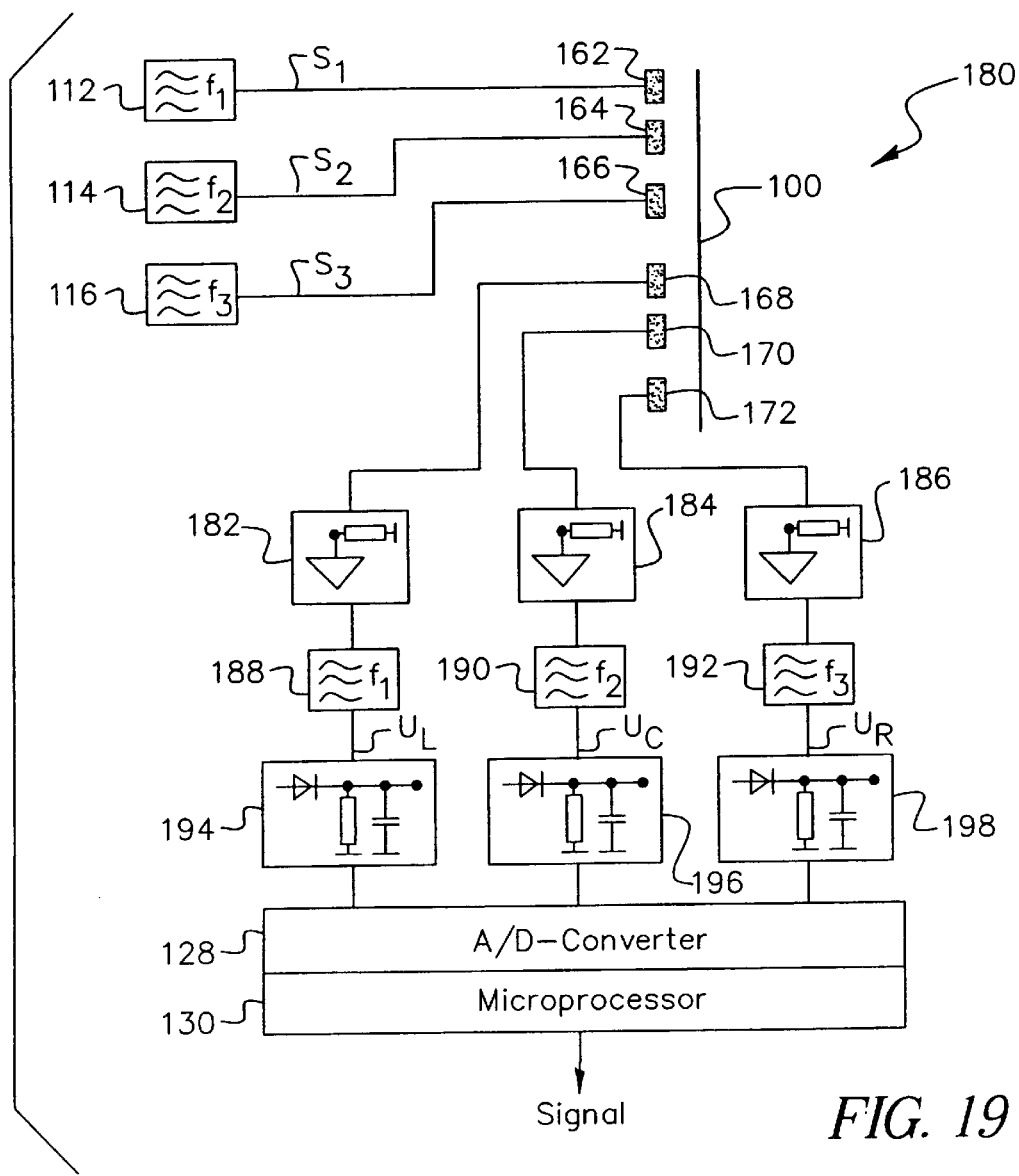
FIG. 19 is a diagram showing components of a reader incorporating the three transmitting electrodes and the three receiving electrodes.

An exemplary reader 180 shown in FIG. 19 incorporating the sensor 160 includes the three oscillators 112, 114, and 116 of the prior readers for supplying the three transmitting electrodes 162, 164, and 166 with the different frequencies $f_1$, $f_2$, and $f_3$. The signals $U_L$, $U_C$, and $U_R$ picked up by the three receiving electrodes 168, 170, and 172 are amplified by buffers 182, 184, and 186; separated into different frequencies by filters by 188, 190, and 192; and detected by demodulators 194, 196, and 198. The detected signals $U_L$, $U_C$, and $U_R$ can be further processed for making relative comparisons as described earlier by the converter 128 and microprocessor 130.

All three frequencies $f_1$, $f_2$, and $f_3$ can be obtained from each receiving electrode 168, 170, and 172 to gather even more information about the precise positioning and features of the barcode 100. The different frequencies can be transmitted from adjacent transmitting electrodes also as discussed in the previous embodiments to provide more precise information.

Figure 20:
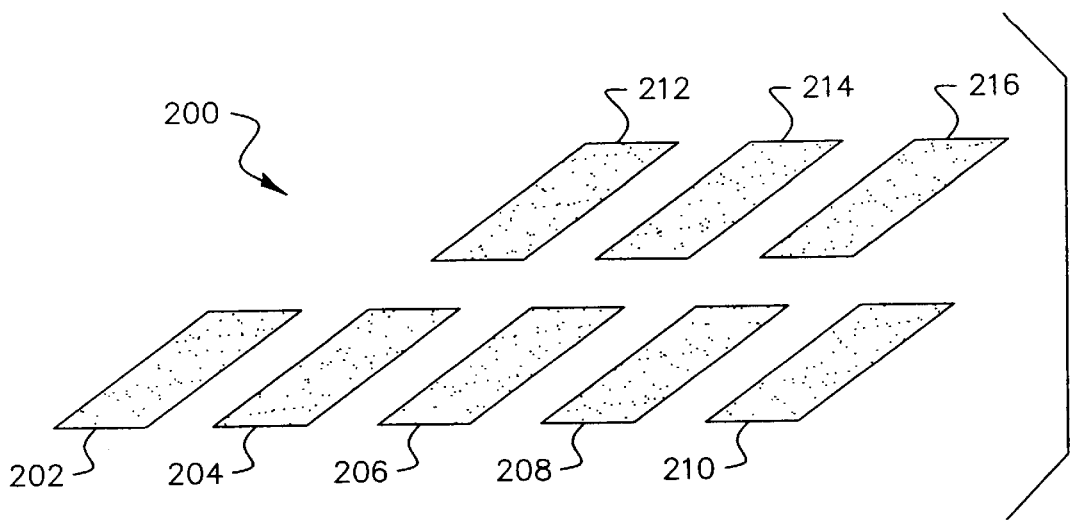
FIG. 20 is a schematic perspective view showing an array of five transmitting electrodes and three receiving electrodes.

A sensor 200 shown in FIG. 20 is especially useful for this latter purpose. Five transmitting electrodes 202, 204, 206, 208, and 210 are variously coupled through the intermediacy of the barcode pattern 100 to three receiving electrodes 212, 214, and 216.

Figure 21:
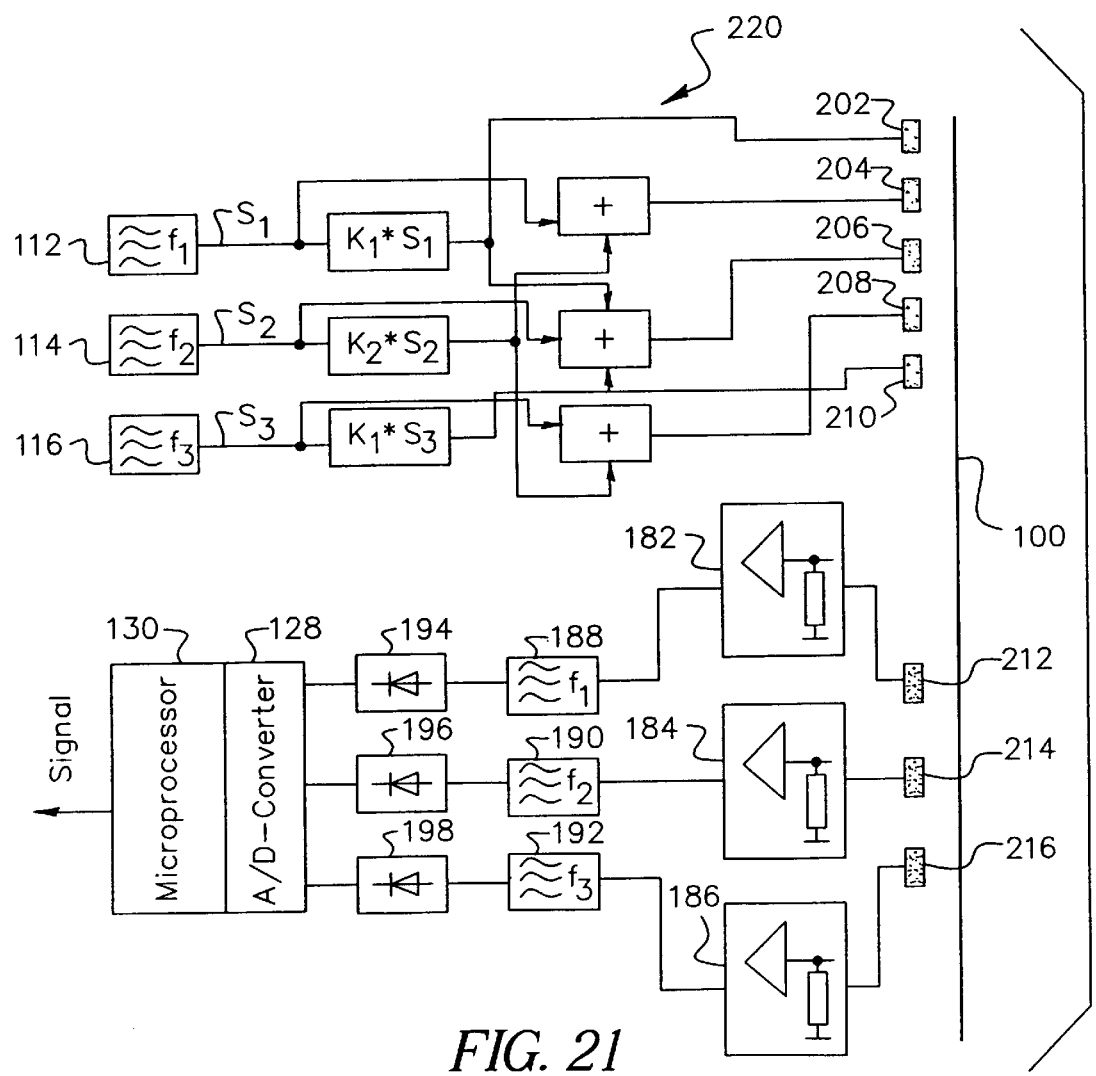
FIG. 21 is a diagram showing components of a reader incorporating the five transmitting electrodes and the three receiving electrodes.

A reader 220 shown in FIG. 21 incorporating the sensor 200 directs each of the frequencies to groups of three transmitting electrodes. The frequency $f_1$ is supplied directly to the transmitting electrode 204 and is amplified by a gain factor K1 before being supplied 180 degrees out of phase to adjacent transmitting electrodes 202 and 206. The frequency $f_2$ is supplied directly to the transmitting electrode 206 and is amplified by a gain factor K1 before being supplied 180 degrees out of phase to adjacent transmitting electrodes 204 and 208. The frequency $f_3$ is supplied directly to the transmitting electrode 208 and is amplified by a gain factor K1 before being supplied 180 degrees out of phase to adjacent transmitting electrodes 206 and 210. The received signals $U_L$, $U_C$, and $U_R$ are then amplified, filtered, and detected similar to the other embodiments.

Figure 22:
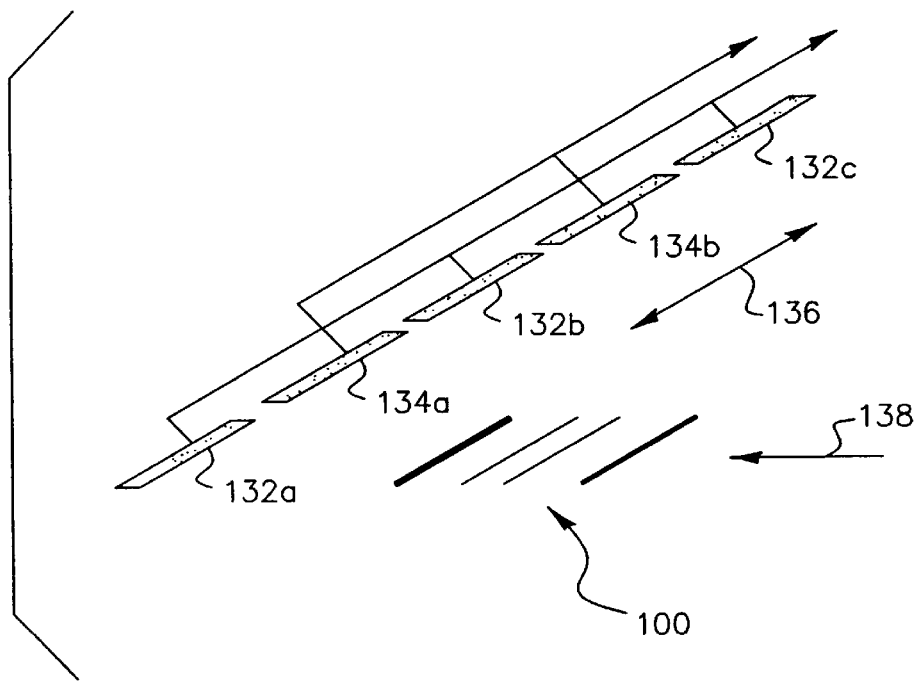
FIG. 22 is a schematic perspective view of an alternative electrode array for monitoring more width of a passing envelope.

In order to keep the dimension of the conductive markings as small as possible (e.g., the height h of a bar in a barcode as small as possible), it may be necessary to form a sensor arrangement that allows for a detailed view of a large area, especially if the position of the conductive markings is not known. This can be accomplished without any loss of sensitivity by constructing a linear array of sensors as shown in FIG. 22. Three or more pairs of transmitting and receiving electrodes 132a and 134a, 132b and 134b, and 132c and 134c (not shown) are positioned along an axis 136 that is transverse to a direction of relative movement along an axis 138. The transmitting electrodes 132a, 132b, and 132c can be connected in parallel with each other; and the receiving electrodes 134a, 134b, and 134c can also be connected in parallel with each other both for the purpose of incorporating the electrode pairs into a single reader.

Although single transmitting and receiving electrodes are depicted in FIG. 22, either the transmitting electrodes or the receiving electrodes or both the transmitting and the receiving electrodes can be replaced by electrodes in a group of three or more according to any of the sensor embodiments described earlier. For those embodiments using three or more receiving electrodes or three or more transmitting electrodes, similar parallel connections can be made without requiring additional electronics. However, in the case of three receiving electrodes, it is recommended that these be decoupled by means of individual buffer stages in order to maintain a sufficiently high input impedance.

Figure 23:
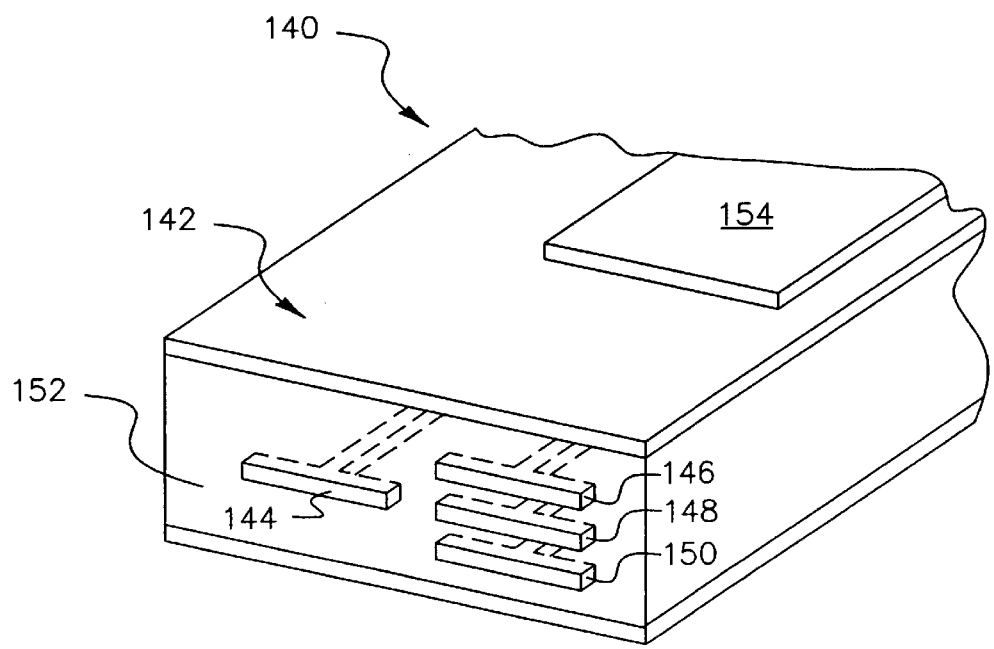
FIG. 23 is a schematic perspective view of a circuit board incorporating an electrode array and other components of our reader.

A sensor head 140 shown in FIG. 23, which is representative of the sensors described earlier, can be easily constructed at little cost using a multi-layer printed circuit board 142. A receiving electrode 144 and three transmitting electrodes 146, 148, and 150 are formed as layers of copper exposed on an end face 152 of the board 142. The thicknesses and lengths of the respective copper layers that are flush with the end face 152 form the respective electrode areas. The board also includes an input buffer stage 154, which features an extremely high input impedance and at the same time drives the necessary shield areas. The sensor head 140 can be connected to the required electronic evaluation unit (oscillator, demodulator, A/D converter, microprocessor, etc.) by means of a replaceable plug connector. Depending on requirements of a specific use, different sensor heads can be connected to the same electronic unit.

In all the above embodiments, the signals induced in the receiving electrodes can be transferred to a microprocessor by way of an A/D converter and can be evaluated by software that performs comparisons between the different signals. The comparisons preferably involve contrasting simultaneously acquired signals or combinations of such signals to each other for reaching conclusions that distinguish features of the conductive patterns. The electrodes themselves are sized and spaced apart relative to the size and spacing of the features being distinguished. Neither variations in the overall amplitude of the signals nor their rate of acquisition (i.e., the relative motion between the sensors and the patterns) necessarily affect these comparisons.

Figure 24:
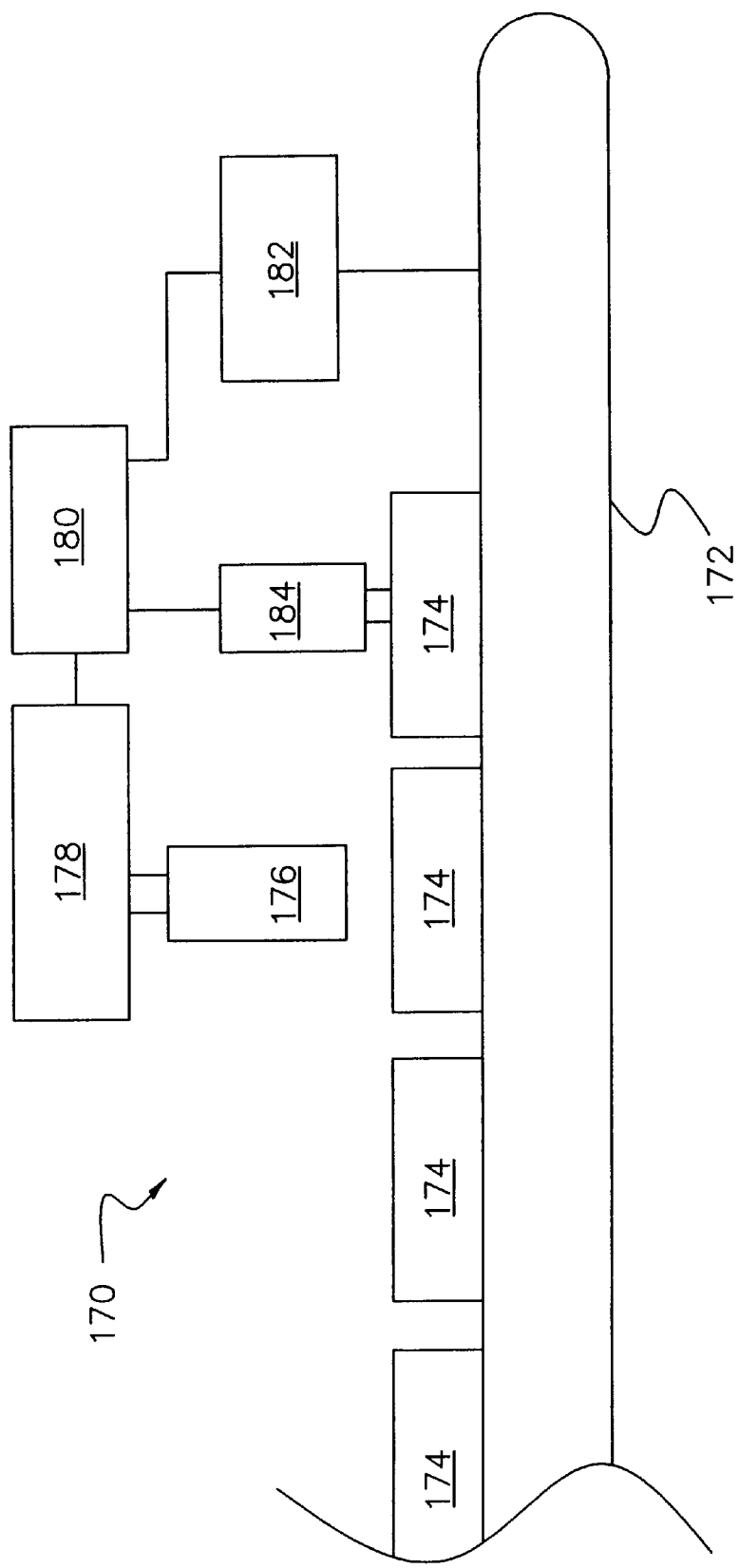
FIG. 24 is a diagram of an in-line system including a transporter for moving a series of envelopes containing hidden information encoded in differentially conductive patterns past our reader.

FIG. 24 shows an in-line system 170 including a transporter 172, such as a belt drive, for moving a train of envelopes 174 past a sensor 176, which can be arranged similar to any of the preceding sensors. Barcode patterns are printed in conductive ink on inserts contained inside each of the envelopes 174. Signal conditioning circuitry 178 connected to the sensor 176 feeds the sensor signals into the microprocessor or computer 180, and the signals are evaluated to distinguish features of the conductive patterns carried inside the envelopes 174. Once distinguished, the patterns can be decoded by standard barcode interpretation software in order to reconstitute the information encoded on the inserts that are hidden inside the envelopes 174.

The microprocessor or computer 180 can also be used to monitor the speed with which the envelopes 174 are measured to arrive at the sensor 176, and this information can be used to stop or alter the speed of a drive 182 for the transport 172. A variety of additional processing can take place based on the information acquired from the contents of the envelopes 174. For example, the envelopes 174 can be sorted according to their contents, orders or replies can be generated, records can be updated, or the information can be verified. A conventional printer 184 can be controlled to print information on the envelopes' outer surfaces, which can be linked to the information acquired from the contents of the envelopes 174. For example, addresses can be printed to match addresses or other identifying information acquired from the contents of the envelopes 174. Detection of encoded barcode patterns can also reveal whether the correct number of inserts exists in the envelope or whether "double-stuffing" has occurred.

Instead of printing the address information on the envelopes' outer surfaces, previously printed address information could be read from the envelopes' outer surfaces by a conventional optical reader and compared with the identifying information acquired from their contents. Further processing of the envelopes can be interrupted upon detection of a mismatch between the two addresses, and the mismatch can be corrected. While the information encoded in the envelopes' contents is preferably a conventional barcode, other symbols interpretable in alphanumeric characters could also be used to support the further processing of the envelopes 174. Unique self-defined symbols could also be used.

In addition to the processing of envelopes with hidden contents, the invention can also be used to read information hidden in other ways such as within packaging or behind labels. For example, conductive ink could be used to print instructional or identifying information between layers of labels or other laminates to control further operations on or with the labels.

We claim:

1. A reader for acquiring information encoded by a differentially conductive pattern comprising:

a plurality of electrodes positioned within one or more electrical fields generated by at least one of the electrodes;

a signal processor that obtains capacitive coupling measurements of the differentially conductive pattern between at least three different pairings of the electrodes as the differentially conductive pattern is relatively moved through the one or more electrical fields; and a logic processor that performs a first comparison between coupling measurements from at least two of the pairings to initiate a second comparison between coupling measurements involving other of the pairings to distinguish features within the differentially conductive pattern.

2. The reader of claim 1 in which the second comparison compares simultaneous coupling measurements to each other independently of variations having similar effects on the compared coupling measurements.

3. The reader of claim 2 in which the logic processor first combines at least two of the coupling measurements and compares the combined coupling measurements to at least one other of the coupling measurements for performing the second comparison.

4. The reader of claim 2 in which the second comparison is initiated when the coupling measurements of the first comparison are equal.

5. The reader of claim 1 further comprising a transporter that relatively moves the differentially conductive pattern with respect to the plurality of electrodes along a transport axis.

6. The reader of claim 5 in which a first, a second, and a third of the electrodes are positioned along the transport axis and oriented together with respect to a fourth electrode for producing capacitive coupling measurements between each of the three electrodes and the fourth electrode.

7. The reader of claim 6 in which the fourth electrode is aligned with the second electrode in the same position along the transport axis.

8. The reader of claim 6 in which the logic processor performs the first comparison by comparing the coupling measurements between the fourth electrode and each of the first and third electrodes.

9. The reader of claim 8 in which the first comparison determines a reference point in the differentially conductive pattern.

10. The reader of claim 6 in which the first, second, third, and fourth electrodes are elongated in a common direction that extends perpendicular to the transport axis.

11. The reader of claim 1 in which at least one of the electrodes is a receiving electrode and at least three other of the electrodes are transmitting electrodes.

12. The reader of claim 11 in which the three transmitting electrodes transmit at different frequencies.

13. The reader of claim 12 in which the signal processor includes a demultiplexer that distinguishes coupling measurements at the different frequencies.

14. A barcode reader comprising:
an array of electrodes positioned along a common axis and together with at least one more electrode providing at least three different capacitive couplings; and
a processor that compares simultaneous measurements from a first grouping of the capacitive couplings to locate reference points in the barcode and that compares simultaneous measurements from a second grouping of the capacitive couplings to distinguish variations in a dimension of the barcode.

15. The reader of claim 14 in which the processor initiates the comparison of the simultaneous measurements from the second grouping of the capacitive couplings at a predetermined outcome of the comparison of the simultaneous measurements from the first grouping of the capacitive couplings.

16. The reader of claim 14 in which the processor identifies the reference points when individual bars of the barcode are located in predetermined positions along the common axis of the array.

17. The reader of claim 16 in which the comparison of the simultaneous measurements from the second grouping of the capacitive couplings distinguishes a width dimension of the individual bars along the common axis of the array.

18. The reader of claim 14 in which the array of electrodes includes first and third electrodes straddling a second electrode along the common axis.

19. The reader of claim 18 in which the processor compares simultaneous coupling measurements between the at least one more electrode and each of the first and third electrodes to locate the reference points in the barcode.

20. The reader of claim 19 in which the processor compares simultaneous coupling measurements generated between the at least one more electrode and the second electrode with simultaneous coupling measurements generated between the at least one more electrode and each of the first and third electrodes to distinguish variations in the barcode dimension.

21. The reader of claim 14 in which the array of electrodes includes a first, a second, and a third electrode positioned along the common axis.

22. The reader of claim 21 in which the first, second, and third electrodes couple with the at least one more electrode at different first, second, and third frequencies.

23. The reader of claim 22 further comprising a demultiplexer for distinguishing coupling measurements at the different frequencies.

24. The reader of claim 22 in which the second frequency is applied to the second electrode at a first reference phase and is also applied to the first and second electrodes at a different phase to reduce overcoupling between adjacent bars of the barcode.

25. The reader of claim 14 in which the electrodes have a width measured along a common axis that is approximately equal to a narrowest bar width of the barcode.

26. A reader for acquiring information encoded by a differentially conductive pattern comprising:
an array of transmitting electrodes together with at least one receiving electrode providing at least three different capacitive couplings;
frequency generators for powering the transmitting electrodes at different frequencies;
a demultiplexer that distinguishes capacitive coupling measurements at the different frequencies; and
a processor that compares the capacitive coupling measurements at the different frequencies to distinguish features within the differentially conductive pattern.

27. The reader of claim 26 in which the processor performs a first comparison among a first grouping of the capacitive couplings and initiates a second comparison among a second grouping of the capacitive couplings coinciding with a predetermined outcome from the first comparison.

28. The reader of claim 27 in which the first comparison locates a reference mark in the differentially conductive pattern and the second comparison distinguishes variations in a dimension of the differentially conductive pattern.

29. The reader of claim 26 in which a first, a second, and a third of the transmitting electrodes are located along a common axis and are powered to transmit first, second, and third frequencies.

30. The reader of claim 29 in which the second frequency powering the second transmitting electrode also powers the first and third transmitting electrodes out of phase with respect to the second transmitting electrode.

31. The reader of claim 29 including fourth and fifth transmitting electrodes straddling the first, second, and third electrodes along the common axis.

32. The reader of claim 31 in which (a) the first frequency powering the first transmitting electrode also powers the second and fourth transmitting electrodes out of phase with respect to the first transmitting electrode, (b) the second frequency powering the second transmitting electrode also powers the first and third transmitting electrodes out of phase with respect to the second transmitting electrode, and (c) the third frequency powering the third transmitting electrode also powers the second and fifth transmitting electrodes out of phase with respect to the third transmitting electrode.

33. A system for processing hidden patterns imprinted in a succession of covered substrates and exhibiting a differential conductivity with respect to the substrates comprising:
a transporter that conveys the succession of covered substrates imprinted with the hidden patterns in a first direction;
an array of electrodes positioned along the first direction and together with at least one more electrode providing at least three different capacitive couplings that are affected by the conductivity characteristics of the hidden patterns; and
a processor that performs a first comparison among a first grouping of the capacitive couplings and initiates a second comparison among a second grouping of the capacitive couplings coinciding with a predetermined outcome from the first comparison for distinguishing features of the hidden patterns.

34. The system of claim 33 in which the processor performs the first comparison by comparing simultaneous measurements from the first grouping of the capacitive couplings to locate reference points in the hidden patterns and performs the second comparison by simultaneous measurements from the second grouping of the capacitive couplings to distinguish features of the hidden patterns.

35. The system of claim 33 in which the hidden patterns are formed by barcode having a dimension that varies along the first direction.

36. The system of claim 35 in which the first comparison performed by the processor identifies the reference points when individual bars of the barcode are located in predetermined positions along the array of electrodes.

37. The system of claim 36 in which the second comparison performed by the processor distinguishes the dimension of the individual bars in the first direction along the array.

38. The system of claim 33 in which the array of electrodes includes first and third electrodes straddling a second electrode along the first direction.

39. The system of claim 38 in which the processor compares simultaneous coupling measurements between the at least one more electrode and each of the first and third electrodes to locate reference points in the barcode.

40. The system of claim 39 in which the processor compares simultaneous coupling measurements generated between the at least one more electrode and the second electrode with simultaneous coupling measurements generated between the at least one more electrode and each of the first and third electrodes to distinguish the dimension of individual bars in the first direction along the array.

41. The system of claim 33 in which the processor matches the distinguished features of the hidden patterns with similar stored patterns for extracting information from the hidden patterns.

42. The system of claim 41 further comprising a sorter that distinguishes subsequent processing of the covered substrates based on the extracted information from the hidden patterns.

43. A method of acquiring information encoded by a differentially conductive pattern comprising the steps of:
relatively moving the differentially conductive pattern in a first direction past a capacitive coupling device having a plurality of electrodes positioned within one or more electrical fields generated by at least one of the electrodes;
obtaining capacitive coupling measurements of the differentially conductive pattern between at least three different pairings of the electrodes;
performing a first comparison between coupling measurements from at least two of the pairings to initiate a second comparison between coupling measurements involving other of the pairings; and
performing the second comparison to distinguish features within the differentially conductive pattern.

44. The method of claim 43 in which said step of performing the second comparison includes comparing simultaneous coupling measurements to each other independently of variations having similar effects on the compared coupling measurements.

45. The method of claim 44 in which said step of performing the second comparison involves combining at least two of the coupling measurements and comparing the combined coupling measurements to at least one other of the coupling measurements.

46. The method of claim 44 in which said step of performing the first comparison involves initiating the second comparison when coupling measurements of the first comparison are equal.

47. The method of claim 43 in which said step of relatively moving includes relatively moving the differentially conductive pattern past a succession of a first, a second, and a third electrode positioned in sequence along an axis that extends in the first direction.

48. The method of claim 47 in which said step of relatively moving also includes relatively moving the differentially conductive pattern past a fourth electrode that is capacitively coupled to the first, the second, and the third electrodes.

49. The method of claim 48 in which said step of obtaining includes transmitting a different signal from each of said first, second, and third electrodes for distinguishing capacitive couplings made with the fourth electrode.

50. The method of claim 48 in which said step of performing the first comparison includes comparing capacitive couplings made with the first and third electrodes.

51. The method of claim 50 in which said step of performing the second comparison includes comparing a combination of the capacitive couplings made by the first and third electrodes with a capacitive coupling made by the second electrode.

52. The method of claim 43 in which said step of obtaining includes obtaining capacitive coupling measurements among the electrodes at different frequencies.

53. The method of claim 52 in which a frequency conveyed by one electrode is the same as a frequency conveyed by an adjacent electrode and said frequency conveyed by the adjacent electrode is out of phase with respect to the frequency conveyed by the one electrode.

54. The method of claim 43 in which the information is encoded in barcode in which said step of relatively moving includes relatively moving the barcode past a succession of the electrodes.

55. A method of reading barcode encoded by a differentially conductive pattern comprising the steps of:
   relatively moving the barcode past an array of electrodes positioned along a common axis and providing at least three different capacitive couplings;
   obtaining simultaneous measurements of the capacitive couplings; and
   comparing the simultaneous measurements to each other independently of variations having similar effects on the compared measurements to distinguish meaningful variations in a dimension of the barcode.

56. The method of claim 55 in which said step of comparing includes comparing simultaneous measurements from a first grouping of the capacitive couplings to locate reference points in the barcode.

57. The method of claim 56 in which said step of comparing also includes comparing simultaneous measurements from a second grouping of the capacitive couplings to distinguish the variations in the barcode dimension.

58. The method of claim 57 including the further step of initiating the comparison of simultaneous measurements from the second grouping of the capacitive couplings at a predetermined outcome of the comparison of simultaneous measurements from the first grouping of the capacitive couplings.

59. The method of claim 55 in which the array of electrodes includes first and third electrodes straddling a second of the electrodes and the step of comparing includes comparing capacitive coupling measurements between the first and third electrodes to locate reference points in the barcode.

60. The method of claim 59 in which said step of comparing includes comparing a combination of the coupling measurements of the first and third electrodes with a coupling measurement of the second electrode to distinguish variations in the barcode.

61. A reader for acquiring information encoded by a differentially conductive pattern comprising:
   a plurality of electrodes positioned within one or more electrical fields generated by at least one of the electrodes;
   a signal processor that obtains simultaneous capacitive coupling measurements of the differentially conductive pattern between at least three different pairings of the electrodes as the differentially conductive pattern is relatively moved through the one or more electrical fields; and
   a processor that compares the simultaneous measurements to each other independently of variations having similar effects on the compared measurements to distinguish meaningful features of the differentially conductive pattern.

62. The reader of claim 61 in which at least some of the electrodes are arranged in an array and positioned along a common axis.

63. The reader of claim 61 in which the processor compares simultaneous measurements from a first grouping of the paired electrodes to locate a reference point in the differentially conductive pattern.

64. The reader of claim 61 in which the processor compares simultaneous measurements from a first grouping of the paired electrodes and uses an outcome of the comparison to trigger another comparison between simultaneous measurements from a second grouping of the paired electrodes to distinguish the meaningful features of the differentially conductive pattern.

65. The reader of claim 62 further comprising a transporter that relatively moves the differentially conductive pattern past the electrodes along the common axis.

66. The reader of claim 65 in which the differentially conductive pattern is a barcode pattern.

67. The reader of claim 66 in which the processor compares the simultaneous measurements to each other independently of variations having similar effects on the compared measurements to distinguish a width dimension of the barcode along the common axis.

68. The reader of claim 61 in which the capacitive coupling measurements distinguish different amounts of overlap between the paired electrodes and the differentially conductive pattern.

69. The reader of claim 68 in which at least one dimension of the differentially conductive pattern is distinguished by a number of the paired electrodes overlapped by a feature of the differentially conductive pattern.

* * * * *